United States Patent
Bai et al.

(10) Patent No.: US 12,519,603 B2
(45) Date of Patent: Jan. 6, 2026

(54) TECHNIQUES FOR PRECODING IN FULL DUPLEX WIRELESS COMMUNICATIONS SYSTEMS

(71) Applicant: QUALCOMM Incorporated, San Diego, CA (US)

(72) Inventors: Tianyang Bai, Somerville, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 17/492,026

(22) Filed: Oct. 1, 2021

(65) Prior Publication Data
US 2022/0109550 A1    Apr. 7, 2022

Related U.S. Application Data

(60) Provisional application No. 63/087,802, filed on Oct. 5, 2020.

(51) Int. Cl.
*H04L 5/14*    (2006.01)
*H04B 7/0456*    (2017.01)

(52) U.S. Cl.
CPC ............. *H04L 5/14* (2013.01); *H04B 7/0456* (2013.01)

(58) Field of Classification Search
CPC ................................ H04L 5/14; H04B 7/0456
See application file for complete search history.

(56) References Cited

U.S. PATENT DOCUMENTS

| 5,218,680 | A | 6/1993 | Farrell et al. |
| 8,160,101 | B2 * | 4/2012 | Kwak ................. H04B 7/2615 370/473 |

(Continued)

FOREIGN PATENT DOCUMENTS

| CN | 109314983 A | 2/2019 |
| EP | 3637836 A1 | 4/2020 |

(Continued)

OTHER PUBLICATIONS

CATT: "TDD Inter-Band Carrier Aggregation", 3GPP Draft, R1-121081, 3GPP TSG RAN WG1 Meeting #68bis, 3rd Generation Partnership Project (3GPP), Mobile Competence Centre, 650, Route Des Lucioles, F-06921 Sophia-Antipolis Cedex, France, vol. RAN WG1, No. Jeju, Korea, Mar. 26, 2012-Mar. 30, 2012, Mar. 20, 2012 (Mar. 20, 2012), XP050599384, 5 Pages, [retrieved on Mar. 20, 2012] Section 2.2.

(Continued)

*Primary Examiner* — Peter Chen
*Assistant Examiner* — Jia Hao Deng
(74) *Attorney, Agent, or Firm* — Holland & Hart LLP/QUALCOMM Incorporated

(57) ABSTRACT

Methods, systems, and devices for wireless communications are described. A communication device, otherwise known as a user equipment (UE) may support use of separate precoding matrices, among other parameters, while the UE is operating in a half duplex mode or a full duplex mode, or a combination thereof. For example, the UE may determine a first precoding matrix associated with wireless communication (e.g., downlink, uplink) when in a half duplex mode during a first portion of a transmission time interval (TTI), and determine a second precoding matrix to use for the wireless communication when in a full duplex mode during a second portion of the TTI. The second precoding matrix may be different from the first precoding. The UE may, as a (Continued)

result, perform the wireless communication based on the second precoding matrix when in the full duplex mode during the second portion of the TTI.

36 Claims, 21 Drawing Sheets

(56) References Cited

U.S. PATENT DOCUMENTS

| | | | |
|---|---|---|---|
| 9,572,063 B2 | 2/2017 | Etemad et al. | |
| 9,577,813 B2* | 2/2017 | Karjalainen | H04W 72/12 |
| 9,641,309 B2* | 5/2017 | Ko | H04L 5/0062 |
| 11,271,625 B2* | 3/2022 | Park | H04L 5/0051 |
| 11,588,585 B2* | 2/2023 | Shao | H04L 1/08 |
| 11,736,986 B2 | 8/2023 | Kung et al. | |
| 2009/0249153 A1 | 10/2009 | Zhang | |
| 2011/0292843 A1 | 12/2011 | Gan et al. | |
| 2013/0223294 A1 | 8/2013 | Karjalainen et al. | |
| 2015/0304883 A1 | 10/2015 | Tabet et al. | |
| 2016/0105878 A1 | 4/2016 | Zhao et al. | |
| 2016/0219583 A1 | 7/2016 | Blankenship | |
| 2016/0242176 A1 | 8/2016 | Sun et al. | |
| 2017/0026942 A1 | 1/2017 | Vajapeyam et al. | |
| 2017/0054544 A1 | 2/2017 | Kazmi et al. | |
| 2017/0289733 A1 | 10/2017 | Rajagopal et al. | |
| 2017/0295594 A1 | 10/2017 | Ozturk et al. | |
| 2018/0007667 A1 | 1/2018 | You et al. | |
| 2018/0098349 A1 | 4/2018 | Sun et al. | |
| 2018/0123710 A1 | 5/2018 | Kim et al. | |
| 2018/0160445 A1 | 6/2018 | Babaei et al. | |
| 2018/0352582 A1 | 12/2018 | Yi et al. | |
| 2019/0075585 A1 | 3/2019 | Deogun et al. | |
| 2019/0104539 A1 | 4/2019 | Park et al. | |
| 2019/0132838 A1 | 5/2019 | Yi et al. | |
| 2019/0150032 A1 | 5/2019 | Takeda et al. | |
| 2019/0335471 A1 | 10/2019 | Kim et al. | |
| 2019/0357149 A1 | 11/2019 | Zhang | |
| 2019/0373588 A1 | 12/2019 | Bae et al. | |
| 2020/0145998 A1 | 5/2020 | Sun et al. | |
| 2020/0154440 A1 | 5/2020 | Gholmieh et al. | |
| 2020/0220585 A1 | 7/2020 | Wilson et al. | |
| 2020/0235980 A1 | 7/2020 | John Wilson et al. | |
| 2020/0245335 A1 | 7/2020 | Joseph et al. | |
| 2020/0296701 A1 | 9/2020 | Park et al. | |
| 2020/0313837 A1 | 10/2020 | Vejlgaard et al. | |
| 2020/0404684 A1 | 12/2020 | Lee et al. | |
| 2021/0058967 A1 | 2/2021 | Oteri et al. | |
| 2021/0259000 A1 | 8/2021 | Khoshnevisan et al. | |
| 2021/0321413 A1 | 10/2021 | Shin et al. | |
| 2021/0344455 A1 | 11/2021 | Choi et al. | |
| 2021/0351881 A1 | 11/2021 | Park et al. | |
| 2021/0377926 A1 | 12/2021 | Li et al. | |
| 2022/0022195 A1 | 1/2022 | Bruun et al. | |
| 2022/0039115 A1 | 2/2022 | Sun et al. | |
| 2022/0069884 A1 | 3/2022 | Zhang et al. | |
| 2022/0078728 A1 | 3/2022 | Yi et al. | |
| 2022/0094484 A1 | 3/2022 | Babaei | |
| 2022/0095083 A1 | 3/2022 | Yeo et al. | |
| 2022/0109551 A1 | 4/2022 | Bai et al. | |
| 2022/0109553 A1 | 4/2022 | Bai et al. | |
| 2022/0110117 A1 | 4/2022 | Bai et al. | |
| 2022/0110137 A1 | 4/2022 | Bai et al. | |
| 2022/0124741 A1 | 4/2022 | Elshafie et al. | |
| 2022/0182160 A1 | 6/2022 | Su et al. | |
| 2023/0032475 A1 | 2/2023 | Bae et al. | |
| 2023/0098368 A1 | 3/2023 | Yu et al. | |
| 2023/0148282 A1 | 5/2023 | Marinier et al. | |

FOREIGN PATENT DOCUMENTS

| | | |
|---|---|---|
| WO | WO-2015096027 A1 | 7/2015 |
| WO | WO-2017029292 A1 | 2/2017 |
| WO | WO-2017172165 A1 | 10/2017 |
| WO | WO-2018058455 A1 | 4/2018 |
| WO | WO-2019032882 A1 | 2/2019 |
| WO | 2019071580 A1 | 4/2019 |
| WO | WO-2020197645 A1 | 10/2020 |

OTHER PUBLICATIONS

International Search Report and Written Opinion—PCT/US2021/053313—ISA/EPO—Jan. 19, 2022.

Qualcomm Incorporated: "Multi-TRP Enhancements", 3GPP Draft, 3GPP TSG-RAN WG1 Meeting #98, R1-1909272 Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765877, 32 Pages, Retrieved from the Internet: URL: http://www.3gpp.org/ftp/tsg_ran/WG1_RL1/TSGR1_98/Docs/R1-1909272.zip [retrieved on Aug. 17, 2019] PDCCH Related Enhancements, p. 1, Paragraph 3.2, Section 4.1.2, p. 21-p. 23, Figure 12.

* cited by examiner

TECHNIQUES FOR PRECODING IN FULL DUPLEX WIRELESS COMMUNICATIONS SYSTEMS

CROSS REFERENCE

The present Application for Patent claims the benefit of U.S. Provisional Patent Application No. 63/087,802 by BAI et al., entitled "TECHNIQUES FOR PRECODING IN FULL DUPLEX WIRELESS COMMUNICATIONS SYSTEMS," filed Oct. 5, 2020, assigned to the assignee hereof, and expressly incorporated by reference herein.

INTRODUCTION

The following relates to wireless communications, including managing wireless communications in half duplex and full duplex wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include operating in a half duplex mode during a first portion of a transmission time interval (TTI), where a first precoding matrix is used for the wireless communication when in the half duplex mode, operating in a full duplex mode during a second portion of the TTI, a second precoding matrix used for the wireless communication when in the full duplex mode, where the second precoding matrix is different from the first precoding matrix, and performing the wireless communication based on the second precoding matrix when in the full duplex mode during the second portion of the TTI.

An apparatus for wireless communication at a UE is described. The apparatus may include a processor, and memory coupled to the processor, the processor and memory configured to operate in a half duplex mode during a first portion of a TTI, where a first precoding matrix is used for the wireless communication when in the half duplex mode, operate in a full duplex mode during a second portion of the TTI, a second precoding matrix used for the wireless communication when in the full duplex mode, where the second precoding matrix is different from the first precoding matrix, and perform the wireless communication based on the second precoding matrix when in the full duplex mode during the second portion of the TTI.

Another apparatus for wireless communication at a UE is described. The apparatus may include means for operating in a half duplex mode during a first portion of a TTI, where a first precoding matrix is used for the wireless communication when in the half duplex mode, means for operating in a full duplex mode during a second portion of the TTI, a second precoding matrix used for the wireless communication when in the full duplex mode, where the second precoding matrix is different from the first precoding matrix, and means for performing the wireless communication based on the second precoding matrix when in the full duplex mode during the second portion of the TTI.

A non-transitory computer-readable medium storing code for wireless communication at a UE is described. The code may include instructions executable by a processor to operate in a half duplex mode during a first portion of a TTI, where a first precoding matrix is used for the wireless communication when in the half duplex mode, operate in a full duplex mode during a second portion of the TTI, a second precoding matrix used for the wireless communication when in the full duplex mode, where the second precoding matrix is different from the first precoding matrix, and perform the wireless communication based on the second precoding matrix when in the full duplex mode during the second portion of the TTI.

Some examples of the method, apparatuses, and non-transitory computer-readable medium described herein may further include operations, features, means, or instructions for receiving an indication to use the first precoding matrix used for the wireless communication while operating in the half duplex mode during the first portion of the TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for receiving a downlink control information (DCI) message including the indication to use the first precoding matrix used for the wireless communication while operating in the half duplex mode during the first portion of the TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for determining a first number of data streams associated with the wireless communication while operating in the half duplex mode during the first portion of the TTI and determining a second number of data streams to use for the wireless communication while operating in the full duplex mode during the second portion of the TTI, where the second number of data streams may be different than the first number of data streams, where performing the wireless communication includes performing the wireless communication based on the second precoding matrix or the second number of data streams, or both, while operating in the full duplex mode during the second portion of the TTI.

In some examples of the method, apparatuses, and non-transitory computer-readable medium described herein, where the first portion of the TTI and the second portion of the TTI include separate reference signals, where a first reference signal associated with the first portion of the TTI may be precoded based on the first precoding matrix, and where a second reference signal associated with the second portion of the TTI may be precoded based on the second precoding matrix.

In some examples of the method, apparatuses, and non-transitory computer-readable medium described herein, the first portion of the TTI and the second portion of the TTI correspond to separate reference signal configurations including a reference signal density in a time domain or a frequency domain, or both, a first reference signal configuration associated with the first portion of the TTI may be different than a second reference signal configuration associated with the second portion of the TTI, and the first reference signal configuration and the second reference signal configuration may be received in a radio resource control (RRC) message, a medium access control-control element (MAC-CE) message, or a DCI message, or a combination thereof.

Some examples of the method, apparatuses, and non-transitory computer-readable medium described herein may further include operations, features, means, or instructions for transmitting or receiving multiple data streams while operating in the half duplex mode during the first portion of the TTI based on a first rank indicator (RI) and transmitting or receiving a single data stream while operating in the full duplex mode during the second portion of the TTI based on a second RI.

Some examples of the method, apparatuses, and non-transitory computer-readable medium described herein may further include operations, features, means, or instructions for transmitting a first precoding matrix indicator (PMI) or a first RI, or both, used for the wireless communication while operating in the half duplex mode, where determining the first precoding matrix used for the wireless communication while operating in the half duplex mode during the first portion of the TTI may be based on the first PMI or the first RI, or both.

Some examples of the method, apparatuses, and non-transitory computer-readable medium described herein may further include operations, features, means, or instructions for transmitting a second PMI or a second RI, or both, used for the wireless communication while operating in the full duplex mode, where the second precoding matrix used for the wireless communication while operating in the full duplex mode during the second portion of the TTI may be based on the second PMI or the second RI, or both.

Some examples of the method, apparatuses, and non-transitory computer-readable medium described herein may further include operations, features, means, or instructions for determining a set of resources associated with using the second precoding matrix for the wireless communication while operating in the full duplex mode during the second portion of the TTI based on a configuration from a base station or a preconfigured rule, or both, where the configuration may be received in an RRC message, a MAC-CE message, or a DCI message, or a combination thereof.

A method for wireless communication at a base station is described. The method may include transmitting, to a UE, signaling that indicates a configuration for the wireless communication, the configuration including an indication for the UE to use a first precoding matrix used for the wireless communication when in a half duplex mode during a first portion of a TTI and a second precoding matrix for the wireless communication when in a full duplex mode during a second portion of the TTI, where the second precoding matrix is different than the first precoding matrix and communicating with the UE according to the configuration for the wireless communication.

An apparatus for wireless communication at a base station is described. The apparatus may include a processor, and memory coupled to the processor, the processor and memory configured to transmit, to a UE, signaling that indicates a configuration for the wireless communication, the configuration including an indication for the UE to use a first precoding matrix used for the wireless communication when in a half duplex mode during a first portion of a TTI and a second precoding matrix for the wireless communication when in a full duplex mode during a second portion of the TTI, where the second precoding matrix is different than the first precoding matrix and communicate with the UE according to the configuration for the wireless communication.

Another apparatus for wireless communication at a base station is described. The apparatus may include means for transmitting, to a UE, signaling that indicates a configuration for the wireless communication, the configuration including an indication for the UE to use a first precoding matrix used for the wireless communication when in a half duplex mode during a first portion of a TTI and a second precoding matrix for the wireless communication when in a full duplex mode during a second portion of the TTI, where the second precoding matrix is different than the first precoding matrix and means for communicating with the UE according to the configuration for the wireless communication.

A non-transitory computer-readable medium storing code for wireless communication at a base station is described. The code may include instructions executable by a processor to transmit, to a UE, signaling that indicates a configuration for the wireless communication, the configuration including an indication for the UE to use a first precoding matrix used for the wireless communication when in a half duplex mode during a first portion of a TTI and a second precoding matrix for the wireless communication when in a full duplex mode during a second portion of the TTI, where the second precoding matrix is different than the first precoding matrix and communicate with the UE according to the configuration for the wireless communication.

Some examples of the method, apparatuses, and non-transitory computer-readable medium described herein may further include operations, features, means, or instructions for transmitting the configuration over a DCI message, an RRC message, or a MAC-CE message, or a combination thereof.

Some examples of the method, apparatuses, and non-transitory computer-readable medium described herein may further include operations, features, means, or instructions for communicating a number of data streams during the first portion of the TTI based on a first RI, where communicating the number of data streams includes transmitting or receiving the number of data streams, and communicating another number of data streams during the second portion of the TTI based on a second RI, where the another number of data streams associated with the second portion of the TTI may be different from the number of data streams associated with the first portion of the TTI, where communicating the another number of data streams includes transmitting or receiving the another number of data streams.

In some examples of the method, apparatuses, and non-transitory computer-readable medium described herein, the first portion of the TTI and the second portion of the TTI include separate reference signals, where a first reference signal associated with the first portion of the TTI may be precoded based on the first precoding matrix, and where a second reference signal associated with the second portion of the TTI may be precoded based on the second precoding matrix.

In some examples of the method, apparatuses, and non-transitory computer-readable medium described herein, the first portion of the TTI and the second portion of the TTI correspond to separate reference signal configurations including a reference signal density in a time domain or a frequency domain, or both and a first reference signal configuration associated with the first portion of the TTI may be different than a second reference signal configuration associated with the second portion of the TTI.

A method of wireless communication at a UE is described. The method may include determining a first precoding matrix associated with the wireless communication while operating in a half duplex mode during a first portion of a TTI, determining a second precoding matrix to use for the wireless communication while operating in a full duplex mode during a second portion of the TTI, where the second precoding matrix is different from the first precoding matrix, and performing the wireless communication based on the second precoding matrix while operating in the full duplex mode during the second portion of the TTI.

An apparatus for wireless communication is described. The apparatus may include a processor and memory coupled to the processor, the processor and memory configured to determine a first precoding matrix associated with the wireless communication while operating in a half duplex mode during a first portion of a TTI, determine a second precoding matrix to use for the wireless communication while operating in a full duplex mode during a second portion of the TTI, where the second precoding matrix is different from the first precoding matrix, and perform the wireless communication based on the second precoding matrix while operating in the full duplex mode during the second portion of the TTI.

Another apparatus for wireless communication is described. The apparatus may include means for determining a first precoding matrix associated with the wireless communication while operating in a half duplex mode during a first portion of a TTI, means for determining a second precoding matrix to use for the wireless communication while operating in a full duplex mode during a second portion of the TTI, where the second precoding matrix is different from the first precoding matrix, and means for performing the wireless communication based on the second precoding matrix while operating in the full duplex mode during the second portion of the TTI.

A non-transitory computer-readable medium storing code for wireless communication at a UE is described. The code may include instructions executable by a processor to determine a first precoding matrix associated with the wireless communication while operating in a half duplex mode during a first portion of a TTI, determine a second precoding matrix to use for the wireless communication while operating in a full duplex mode during a second portion of the TTI, where the second precoding matrix is different from the first precoding matrix, and perform the wireless communication based on the second precoding matrix while operating in the full duplex mode during the second portion of the TTI.

Some examples of the method, apparatuses, and non-transitory computer-readable medium described herein may further include operations, features, means, or instructions for receiving an indication to use the first precoding matrix associated with the wireless communication while operating in the half duplex mode during the first portion of a TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for receiving a RRC message including the indication to use the first precoding matrix associated with the wireless communication while operating in the half duplex mode during the first portion of a TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for receiving a MAC-CE message including the indication to use the first precoding matrix associated with the wireless communication while operating in the half duplex mode during the first portion of a TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for receiving a DCI message including the indication to use the first precoding matrix associated with the wireless communication while operating in the half duplex mode during the first portion of a TTI, or the second precoding matrix for the wireless communication while operating in the full duplex mode during the second portion of the TTI, or both.

Some examples of the method, apparatuses, and non-transitory computer-readable medium described herein may further include operations, features, means, or instructions for determining a first number of data streams associated with the wireless communication while operating in the half duplex mode during the first portion of the TTI, determining a second number of data streams to use for the wireless communication while operating in the full duplex mode during the second portion of the TTI, where the second number of data streams may be different than the first number of data streams. In some examples of the method, apparatuses, and non-transitory computer-readable medium described herein, performing the wireless communication includes performing the wireless communication based on the second precoding matrix or the second number of data streams, or both, while operating in the full duplex mode during the second portion of the TTI.

Some examples of the method, apparatuses, and non-transitory computer-readable medium described herein may further include operations, features, means, or instructions for transmitting or receiving multiple data streams while operating in the half duplex mode during the first portion of the TTI based on the first number of data streams.

Some examples of the method, apparatuses, and non-transitory computer-readable medium described herein may further include operations, features, means, or instructions for transmitting or receiving a single data stream while operating in the full duplex mode during the second portion of the TTI based on the second number of data streams.

Some examples of the method, apparatuses, and non-transitory computer-readable medium described herein may further include operations, features, means, or instructions for determining a respective PMI or a respective RI, or both, associated with the wireless communication while operating in the half duplex mode. In some examples of the method, apparatuses, and non-transitory computer-readable medium described herein, determining the first precoding matrix associated with the wireless communication while operating in the half duplex mode during the first portion of the TTI may be based on determining the respective PMI or the respective RI, or both.

Some examples of the method, apparatuses, and non-transitory computer-readable medium described herein may further include operations, features, means, or instructions for transmitting a message including an indication of the respective PMI or the respective RI, or both via a physical uplink channel, where the physical uplink channel includes a physical uplink control channel (PUCCH) or a physical uplink shared channel (PUSCH).

Some examples of the method, apparatuses, and non-transitory computer-readable medium described herein may further include operations, features, means, or instructions for determining a respective PMI or a respective RI, or both, associated with the wireless communication while operating in the full duplex mode. In some examples of the method, apparatuses, and non-transitory computer-readable medium described herein, determining the second precoding matrix associated with the wireless communication while operating in the full duplex mode during the second portion of the TTI may be based on determining the respective PMI or the respective RI, or both.

Some examples of the method, apparatuses, and non-transitory computer-readable medium described herein may further include operations, features, means, or instructions for transmitting a message including an indication of the respective PMI or the respective RI, or both via a physical uplink channel, where the physical uplink channel includes a PUCCH or a PUSCH.

In some examples of the method, apparatuses, and non-transitory computer-readable medium described herein, the first portion of the TTI and the second portion of the TTI include separate reference signals.

In some examples of the method, apparatuses, and non-transitory computer-readable medium described herein, a respective reference signal associated with the first portion of the TTI may be precoded based on the first precoding matrix.

In some examples of the method, apparatuses, and non-transitory computer-readable medium described herein, a respective reference signal associated with the second portion of the TTI may be precoded based on the second precoding matrix.

In some examples of the method, apparatuses, and non-transitory computer-readable medium described herein, a respective reference signal associated with the first portion of the TTI or the second portion of the TTI, or both, includes a demodulation reference signal (DMRS), a phase tracking reference signal (PTRS), a sounding reference signal (SRS), or a channel state information reference signal (CSI-RS), or a combination thereof.

In some examples of the method, apparatuses, and non-transitory computer-readable medium described herein, the first portion of the TTI and the second portion of the TTI correspond to separate reference signal configurations including a reference signal density in a time domain or a frequency domain, or both, where the reference signal configurations may be received in an RRC, a MAC-CE message, or a DCI message, or a combination thereof.

In some examples of the method, apparatuses, and non-transitory computer-readable medium described herein, a respective reference signal configuration associated with the first portion of the TTI may be different than a respective reference signal configuration associated with the second portion of the TTI.

Some examples of the method, apparatuses, and non-transitory computer-readable medium described herein may further include operations, features, means, or instructions for determining an overlap portion between the first portion of the TTI and the second portion of the TTI in a time domain.

Some examples of the method, apparatuses, and non-transitory computer-readable medium described herein may further include operations, features, means, or instructions for enabling a configuration during the overlap portion between the first portion of the TTI and the second portion of the TTI, the configuration includes a separate precoder or a separate number of data streams, or both, to use during the overlap portion.

In some examples of the method, apparatuses, and non-transitory computer-readable medium described herein, the first portion of the TTI exceeds the overlap portion with the second portion of the TTI in the time domain.

Some examples of the method, apparatuses, and non-transitory computer-readable medium described herein may further include operations, features, means, or instructions for determining a set of resources associated with using the second precoding matrix for the wireless communication while operating in the full duplex mode during the second portion of the TTI based on a configuration from a base station or a preconfigured rule, or both, and where the configuration may be received in an RRC, a MAC-CE message, or a DCI message, or a combination thereof.

In some examples of the method, apparatuses, and non-transitory computer-readable medium described herein, the set of resources includes a set of orthogonal frequency-division multiplexing (OFDM) symbols.

In some examples of the method, apparatuses, and non-transitory computer-readable medium described herein, the set of OFDM symbols includes at least one OFDM symbol before the second portion of the TTI or at least one OFDM symbol after the second portion of the TTI, or both.

Some examples of the method, apparatuses, and non-transitory computer-readable medium described herein may further include operations, features, means, or instructions for receiving a message including a configuration including an indication for the UE to use the first precoding matrix associated with the wireless communication while operating in the half duplex mode during the first portion of a TTI and the second precoding matrix for the wireless communication while operating in the full duplex mode during a second portion of the TTI. In some examples of the method, apparatuses, and non-transitory computer-readable medium described herein, the message includes an RRC, a MAC-CE message, or a DCI message, or a combination thereof.

In some examples of the method, apparatuses, and non-transitory computer-readable medium described herein, the wireless communication includes downlink wireless communications.

In some examples of the method, apparatuses, and non-transitory computer-readable medium described herein, the wireless communication includes uplink wireless communications.

In some examples of the method, apparatuses, and non-transitory computer-readable medium described herein, the TTI includes a mini-slot.

In some examples of the method, apparatuses, and non-transitory computer-readable medium described herein, the TTI includes a slot.

A method of wireless communication at a base station is described. The method may include determining a configuration including an indication for a UE to use a first precoding matrix associated with the wireless communication while operating in a half duplex mode during a first portion of a TTI and a second precoding matrix for the wireless communication while operating in a full duplex mode during a second portion of the TTI, where the second precoding matrix is different than the first precoding matrix and transmitting, to the UE, the configuration.

An apparatus for wireless communication is described. The apparatus may include a processor memory coupled to the processor, the processor and memory configured to determine a configuration including an indication for a UE to use a first precoding matrix associated with the wireless communication while operating in a half duplex mode during a first portion of a TTI and a second precoding matrix for the wireless communication while operating in a full duplex mode during a second portion of the TTI, where the second precoding matrix is different than the first precoding matrix and transmit, to the UE, the configuration.

Another apparatus for wireless communication is described. The apparatus may include means for determining a configuration including an indication for a UE to use a first precoding matrix associated with the wireless communication while operating in a half duplex mode during a first portion of a TTI and a second precoding matrix for the wireless communication while operating in a full duplex mode during a second portion of the TTI, where the second precoding matrix is different than the first precoding matrix and means for transmitting, to the UE, the configuration.

A non-transitory computer-readable medium storing code for wireless communication at a base station is described. The code may include instructions executable by a processor to determine a configuration including an indication for a UE to use a first precoding matrix associated with the wireless communication while operating in a half duplex mode during a first portion of a TTI and a second precoding matrix for the wireless communication while operating in a full duplex mode during a second portion of the TTI, where the second precoding matrix is different than the first precoding matrix and transmit, to the UE, the configuration.

Some examples of the method, apparatuses, and non-transitory computer-readable medium described herein may further include operations, features, means, or instructions for transmitting an RRC message including the configuration.

Some examples of the method, apparatuses, and non-transitory computer-readable medium described herein may further include operations, features, means, or instructions for transmitting a MAC-CE message including the configuration.

Some examples of the method, apparatuses, and non-transitory computer-readable medium described herein may further include operations, features, means, or instructions for transmitting a DCI message including the configuration.

Some examples of the method, apparatuses, and non-transitory computer-readable medium described herein may further include operations, features, means, or instructions for receiving a number of data streams while the UE may be operating in the half duplex mode during the first portion of the TTI based on a first RI.

Some examples of the method, apparatuses, and non-transitory computer-readable medium described herein may further include operations, features, means, or instructions for receiving a number of data streams while the UE may be operating in the full duplex mode during the second portion of the TTI based on a second RI. In some examples of the method, apparatuses, and non-transitory computer-readable medium described herein, the number of data stream associated with the second portion of the TTI may be different from a number of data streams associated with the first portion of the TTI.

Some examples of the method, apparatuses, and non-transitory computer-readable medium described herein may further include operations, features, means, or instructions for receiving, from the UE, a message including an indication of a respective PMI or a respective RI, or both via a physical uplink channel, where the physical uplink channel includes a PUCCH or a PUSCH.

In some examples of the method, apparatuses, and non-transitory computer-readable medium described herein, the first portion of the TTI and the second portion of the TTI include separate reference signals.

In some examples of the method, apparatuses, and non-transitory computer-readable medium described herein, a respective reference signal associated with the first portion of the TTI may be precoded based on the first precoding matrix.

In some examples of the method, apparatuses, and non-transitory computer-readable medium described herein, a respective reference signal associated with the second portion of the TTI may be precoded based on the second precoding matrix.

In some examples of the method, apparatuses, and non-transitory computer-readable medium described herein, a respective reference signal associated with the first portion of the TTI or the second portion of the TTI, or both, includes a DMRS, a PTRS, an SRS, or a CSI-RS, or a combination thereof.

In some examples of the method, apparatuses, and non-transitory computer-readable medium described herein, the first portion of the TTI and the second portion of the TTI correspond to separate reference signal configurations including a reference signal density in a time domain or a frequency domain, or both.

In some examples of the method, apparatuses, and non-transitory computer-readable medium described herein, a respective reference signal configuration associated with the first portion of the TTI may be different than a respective reference signal configuration associated with the second portion of the TTI.

In some examples of the method, apparatuses, and non-transitory computer-readable medium described herein, the first portion of the TTI exceeds an overlap portion with the second portion of the TTI in the time domain.

Some examples of the method, apparatuses, and non-transitory computer-readable medium described herein may further include operations, features, means, or instructions for transmitting a second configuration including an indication of a set of resources associated with using the second precoding matrix for the wireless communication while the UE may be operating in the full duplex mode during the second portion of the TTI, where the set of resources includes a set of OFDM symbols.

In some examples of the method, apparatuses, and non-transitory computer-readable medium described herein, the set of OFDM symbols includes at least one OFDM symbol before the second portion of the TTI or at least one OFDM symbol after the second portion of the TTI, or both.

In some examples of the method, apparatuses, and non-transitory computer-readable medium described herein, the wireless communication includes downlink wireless communications.

In some examples of the method, apparatuses, and non-transitory computer-readable medium described herein, the wireless communication includes uplink wireless communications.

In some examples of the method, apparatuses, and non-transitory computer-readable medium described herein, the TTI includes a mini-slot.

In some examples of the method, apparatuses, and non-transitory computer-readable medium described herein, the TTI includes a slot.

DETAILED DESCRIPTION

Figure 1:
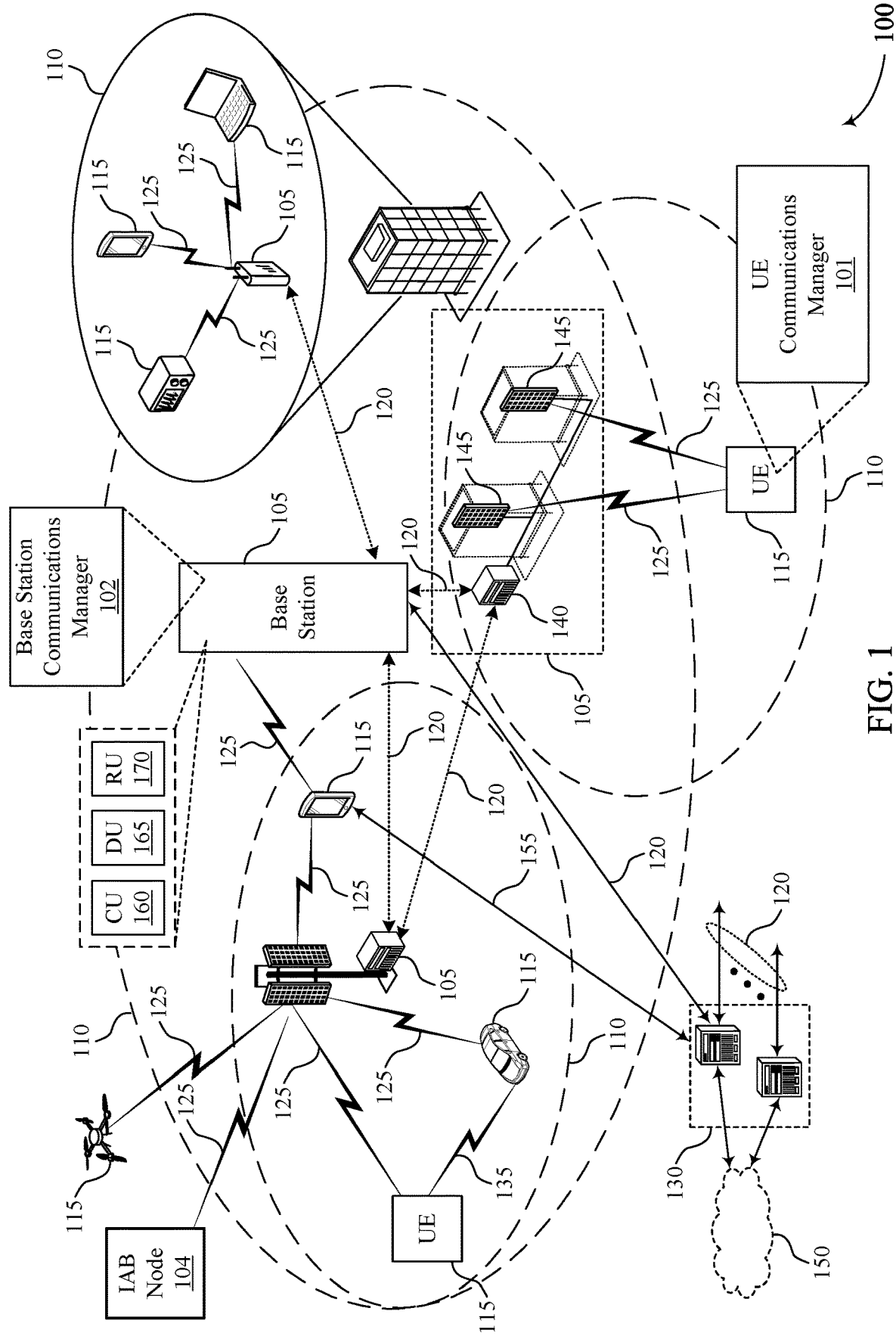
FIGS. 1 and 2 illustrate examples of wireless communications systems that support techniques for precoding in full duplex wireless communications systems in accordance with one or more aspects of the present disclosure.

A wireless communications system may include a communication device, such as a UE and a base station (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. The communication device may operate in a half duplex mode or a full duplex mode, or a combination thereof. For example, in a half duplex mode, a UE may either transmit uplink communications or receive downlink communications during a TTI. In the full duplex mode, the UE may simultaneously transmit uplink communications and receive downlink communications during the TTI. A TTI may span one or more time resources (e.g., symbols, mini-slots, slot, etc.). As described herein overlapping wireless communication by a base station or a UE, or both, may include uplink transmission, uplink reception, downlink transmission, or downlink reception, or a combination thereof, that occurs at the same time (e.g., a symbol period, a mini-slot, a slot, etc.).

A communication device (e.g., a base station, a UE, etc.) may be configured with multiple antennas, which may be used to transmit and receive communications when in a full-duplex mode. In some cases, the communication device may be configured with multiple antennas panels for uplink communications and downlink communications. In some cases, the communication device may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna.

A UE may be configured to operate in a half duplex mode during a portion (e.g., a half duplex portion) of a TTI and in a full duplex mode during another portion (e.g., a full duplex portion) of the TTI. In some examples, the UE may exclusively receive a downlink transmission, from a base station, during the half duplex portion of the TTI, in which the UE is operating in the half duplex mode. Alternatively, the UE may exclusively transmit an uplink transmission, to the base station, during the half duplex portion of the TTI, in which the UE is operating in the half duplex mode. In some other examples, the UE may be configured to simultaneously transmit, to the base station, an uplink transmission and receive a downlink transmission, from the base station, during the other portion (e.g., the full duplex portion) of TTI when the UE is operating in the full duplex mode.

In some cases, when in the full duplex mode, the UE may experience a level of self-interference due to simultaneous uplink and downlink communications. For example, the UE may be configured with multiple antennas panels for uplink communications and downlink communications. In some cases, the UE may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna. Various aspects of the present disclosure relate to configuring a UE to support using separate precoding matrices, among other parameters (e.g., a transmission rank parameter, a reference signal configuration, etc.), while the UE is operating in a duplex mode (e.g., a half duplex mode, a full duplex mode). That is, the UE may be configured to use different precoding matrices when operating in the half duplex mode and the full duplex mode during the same TTI. For example, the UE may use a first precoding matrix when operating in the half duplex mode during a first portion of a slot and use a second precoding matrix when operating in the full duplex mode during a second portion of the slot. The second precoding matrix, for example, may indicate to transmit uplink communications and receive downlink communications using different bandwidth parts (BWP), among other examples. As such, during the second portion of the slot, the UE may both transmit uplink communications (e.g., an uplink report) and receive downlink communications at the same time with reduced or no self-interference.

Aspects of the subject matter described in the disclosure may be implemented to provide for duplex communications (e.g., half duplex communications, full duplex communications). In some examples, configuring the communication device to support techniques for using one precoding matrix to precode wireless communications (e.g., downlink, uplink) while operating in a half duplex mode and using a different precoding matrix to precode wireless communications (e.g., downlink, uplink) while operating in a full duplex mode, may support lower power consumption, higher spectral efficiency, and, in some examples, may promote higher reliability and lower latency duplex communications, among other examples.

Aspects of the disclosure are initially described in the context of wireless communications systems. Aspects of the disclosure are further illustrated by and described with reference to apparatus diagrams, system diagrams, and flowcharts that relate to techniques for precoding in full duplex wireless communications systems.

FIG. 1 illustrates an example of a wireless communications system 100 that supports techniques for precoding in full duplex wireless communications systems in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

A UE 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

In the wireless communications system 100, a UE 115 or a base station 105, or both, may support half duplex communications or full duplex communications, or a combination thereof. For example, a UE 115 may operate in a half duplex mode, in which the UE 115 may either receive downlink communications from a base station 105, or transmit uplink communication to the base station 105, during a TTI. Similarly, a base station 105 may operate in a half duplex mode, in which the base station 105 may either transmit downlink communications to a UE 115, or receive uplink communication from the UE 115, during a TTI. In some cases, a UE 115 or a base station 105, or both, may experience self-interference when operating in a full duplex mode. In some examples, the self-interference may occur due to signal leakage between a transmit antenna and a receive antenna. In some examples, the self-interference may occur from a transmit antenna to a receive chain due to a proxy of a UE 115 or a base station 105, or both. In some other examples, the self-interference may occur from a transmit antenna to a receive chain due to one or more signal reflections as a result of local antenna clutter. In some cases, a self-interference from a transmit signal may be as strong as receive signal with cancellation techniques (e.g., analog cancellation operations, digital cancellation operations, etc.).

A UE 115 or a base station 105, or both, when operating in a full duplex mode may use different BWPs to reduce a self-interference. That is, a UE 115 or a base station 105, or both, may use different BWPs for downlink communications and uplink communications. For example, a UE 115 may use one BWP for receiving downlink transmission from a base station 105, and another BWP for transmitting uplink transmissions to the base station 105. Similarly, a base station 105 may use one BWP for transmitting downlink transmission to a UE 115, and another BWP for receiving uplink transmissions from the UE 115. In some cases, reducing or mitigating self-interference may improve spectrum efficiency in the wireless communications system 100. In some other cases, reducing or mitigating self-interference may provide a higher reliability and a lower latency for wireless communications between a UE 115 and a base station 105, or between at least two UEs 115 (e.g., in D2D wireless communications), etc.

The wireless communications system 100 may, additionally, or alternatively, support decreasing or eliminating self-interference based on beam pair selection. A base station 105 or a UE 115, or both, may reduce or mitigate self-interference based selection of uplink and downlink beam pair. For example, a base station 105 or a UE 115, or both, may select a transmit beam (e.g., a transmit uplink beam, a transmit downlink beam) and a receive beam (e.g. a receive uplink beam, a receive downlink beam) from different antenna panels or beams with different spatial directions and orientations, or the like. In some examples, a base station 105 or a UE 115, or both, may select uplink and downlink beam pairs based on a beam training procedure using simultaneous reference signal sweeping operations (e.g. CSI-RS, SRS, etc.). In a full duplex mode, a base station 105 or a UE 115, or both, may use two beam pair links for uplink and downlink balancing a signal strength in an intended link (e.g., uplink and downlink path loss balancing) and self-interference. For example, if an uplink beam changes then the UE 115 may also update a downlink beam.

In the wireless communications system 100 a UE 115 and a base station 105 (e.g., an eNB, a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The base station 105 and the UE 115 may operate in a half duplex mode or a full duplex mode, or a combination thereof. The wireless communications system 100 may be configured to support techniques for using separate precoding matrices, among other parameters (e.g., a transmission rank parameter, a reference signal configuration, etc.), while the UE 115 is operating in a half duplex mode or a full duplex mode. That is, the UE 115 may be configured to use different precoding matrices when operating in the half duplex mode and the full duplex mode during a same TTI.

A base station 105 may include a base station communications manager 102 that enables the base station 105 to determine and transmit a configuration including an indication for a UE 115 to use a first precoding matrix associated with the wireless communication when in a half duplex mode during a first portion of a TTI and a second precoding matrix for the wireless communication when in a full duplex mode during a second portion of the TTI. A UE 115 may include a UE communications manager 101 that enables the UE 115 to use a first precoding matrix when operating in the half duplex mode during a first portion of a slot and use a second precoding matrix when operating in the full duplex mode during a second portion of the slot. As such, during the second portion of the slot, the UE may both transmit uplink communications (e.g., an uplink report) and receive downlink communications at the same time with reduced or no self-interference.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture) or a disaggregated UE. In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for precoding in full duplex wireless communications as described herein. For example, some operations described as being performed by a UE 115 or a base station 105 may additionally or alternatively be performed by components of the disaggregated RAN architecture (e.g., IAB nodes, DUs, CUs, etc.).

Figure 2:
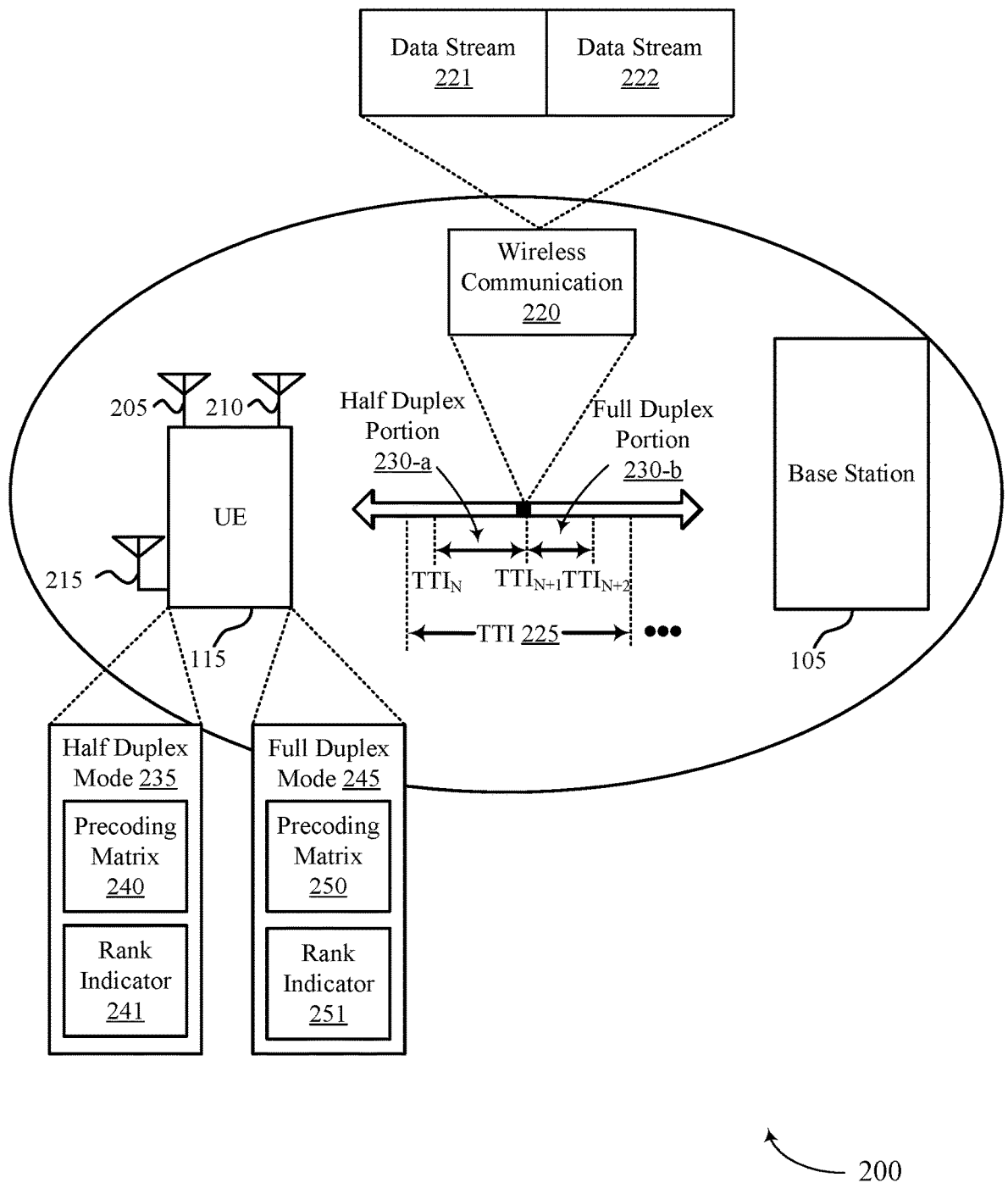

FIG. 2 illustrates an example of a wireless communications system 200 that supports techniques for precoding in full duplex wireless communications systems in accordance with one or more aspects of the present disclosure. The wireless communications system 200 may implement aspects of the wireless communications system 100. For example, the wireless communications system 200 may include a base station 105 and a UE 115, which may be examples of a base station 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally, or alternatively, an antenna panel may support radio frequency beamforming for a signal transmitted via one or more antenna ports. The base station 105 and the UE 115 may thus be configured to support directional communications (e.g., beamformed communications) using the multiple antennas.

The base station 105 or the UE 115, or both may operate in a half duplex mode or a full duplex mode, or a combination thereof. For example, in a half duplex mode, the UE 115 may either transmit uplink communications or receive downlink communications during one or more TTIs 225. In the full duplex mode, the UE 115 may simultaneously transmit uplink communications and receive downlink communications during the one or more TTIs 225. A TTI 225 may span one or more time resources (e.g., symbols, mini-slots, slot, etc.) and one or more frequency resources (e.g., subcarriers, carriers, etc.). The UE 115 may be configured to operate in a half duplex mode during a portion (e.g., a half duplex portion 230-*a*) of a TTI 225 and a full duplex mode during another portion (e.g., a full duplex portion 230-*b*) of the TTI 225.

In some examples, the UE 115 may receive a downlink transmission, from the base station 105, during the half duplex portion 230-*a* of the TTI 225, in which the UE 115 is operating in the half duplex mode. Alternatively, the UE 115 may exclusively transmit an uplink transmission, to the base station 105, during the half duplex portion 230-*a* of the TTI 225, in which the UE 115 is operating in the half duplex mode. In some other examples, the UE 115 may be configured to simultaneously transmit, to the base station 105, an uplink transmission and receive a downlink transmission, from the base station 105, during the other portion (e.g., the full duplex portion 230-*b*) of the TTI 225 when the UE 115 is operating in the full duplex mode.

In the example of FIG. 2, when the base station 105 and the UE 115 are configured with multiple antenna panels, where one antenna panel may be dedicated for downlink communications and another antenna panel may be dedicated for uplink communications, the base station 105 and the UE 115 may experience self-interference. The self-interference may be a result of simultaneously using multiple antenna panels for uplink communications and downlink communications (e.g., in full duplex communications). In some examples, the self-interference may occur due to, for example, signal leakage between a transmit antenna 205 and a receive antenna 210. In some other examples, the self-interference may occur due to, for example, signal leakage between a transmit antenna 215 and the receive antenna 210, but this self-interference may be less compared to the self-interference between the transmit antenna 205 and the receive antenna 210.

The base station 105 or the UE 115, or both, may manage (e.g., reduce or eliminate) self-interference at the base station 105 or the UE 115, or both, by managing one or more transmission parameters (e.g., a precoding matrix parameter, a transmission rank parameter, a reference signal parameter, etc.) when the base station 105 or the UE 115, or both, are operating in a full duplex mode. Managing one or more transmission parameters (e.g., a precoding matrix) when the base station 105 or the UE 115, or both, are operating in a full duplex mode may also increase a downlink throughput to the UE 115 from the base station 105. The base station 105 may, for example, determine a configuration including an indication for the UE 115 to use a first precoding matrix associated with wireless communication 220 (e.g., downlink communications, uplink communications) while operating in a half duplex mode during the half duplex portion 230-*a* of the TTI 225 (e.g., a mini-slot, a slot) and a second precoding matrix for the wireless communication 220 while operating in a full duplex mode during the full duplex portion 230-*b* of the TTI 225 (e.g., a mini-slot, a slot). The second precoding matrix may be different than the first precoding matrix. The base station 105 may transmit, and the UE 115 may receive, the configuration, for example, in an RRC message, a MAC-CE message, or a DCI message, or a combination thereof. As such, the UE 115 may use, in some examples, a first precoding matrix 240 associated with the wireless communication 220 while operating in a half duplex mode 235. Additionally, or alternatively, the UE 115 may use, in some examples, a second precoding matrix 250 associated with the wireless communication 220 while operating in a full duplex mode 245.

The UE 115 may determine, in some examples, a first PMI or a first RI (e.g., rank indicator 241), or both, associated with the wireless communication 220 while operating in the half duplex mode. Additionally, or alternatively, the UE 115 may determine, in some examples, a second PMI or a second RI (e.g., rank indicator 251), or both, associated with the wireless communication 220 while operating in the full duplex mode. The UE 115 may transmit a message (e.g., uplink control information) including an indication of the PMI or the RI, or both, for when the UE 115 is operating in the half duplex mode or the full duplex mode, or both, via a physical uplink channel. The physical uplink channel may include a PUCCH or a PUSCH.

The UE 115 may determine a first rank indicator 241 associated with the wireless communication 220 while operating in the half duplex mode during the half duplex portion 230-*a* of the TTI 225, or a second rank indicator 251 associated with the wireless communication 220 while operating in the full duplex mode during the full duplex portion 230-*b* of the TTI 225. The UE 115 may transmit a message (e.g., uplink control information) including an indication of the first rank indicator 241 or the second rank indicator 251, or both, via a physical uplink channel. The first rank indicator 241 and the second rank indicator 251 may be the UE 115 recommendation to the base station 105, but when the base station 105 determines downlink and uplink scheduling, the base station 105 may determine a number of data streams (e.g., data stream 221 and data stream 222), and the number can be different from the UE's 115 recommended rank indicator.

The UE 115 may thereby determine, based on scheduling information, for example, carried in a grant, a first number of data streams associated with the wireless communication 220 while operating in the half duplex mode during the half duplex portion 230-*b* of the TTI 225, and a second number of data streams to use for the wireless communication 220 while operating in the full duplex mode during the full duplex portion 230-*b* of the TTI 225. The second number of data streams may be different than the first number of data streams. For example, the UE 115 may receive fewer number of data streams while operating in the full duplex mode during the full duplex portion 230-*b* of the TTI 225 compared to the half duplex mode during the half duplex portion 230-*a* of the TTI 225.

Figure 4:
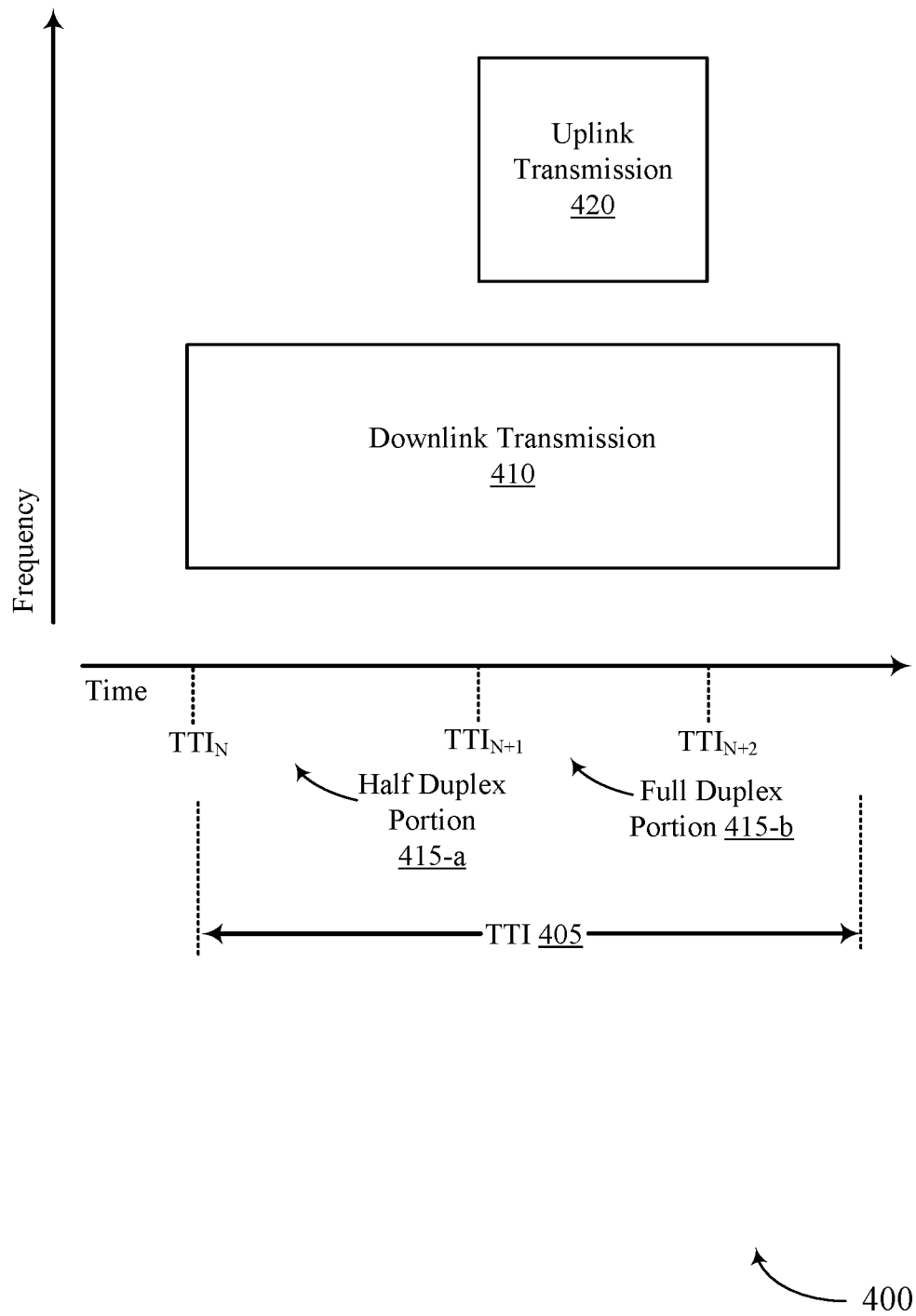
FIGS. 4 and 5 illustrate examples of downlink and uplink configurations that support techniques for precoding in full duplex wireless communications systems in accordance with one or more aspects of the present disclosure.

In the example of FIG. 2, the half duplex portion 230-*a* and the full duplex portion 230-*b* of the TTI 225 may correspond to separate reference signals, as described in FIG. 4. Examples of reference signals include a DMRS, a PTRS, an SRS, a CSI-RS, among other examples. These separate reference signals may be precoded with a same precoding matrix as downlink and uplink data in each portion 230 of the TTI 225. For example, a first reference signal (e.g., a DMRS) associated with the half duplex portion 230-*a* of the TTI 225 may be precoded based on the first precoding matrix, and a second reference signal (e.g., a DMRS) associated with the full duplex portion 230-*b* of the TTI 225 may be precoded based on the second precoding matrix.

Additionally, or alternatively, in the example of FIG. 2, the half duplex portion 230-*a* and the full duplex portion 230-*b* of the TTI 225 may correspond to separate reference signal configurations. In other words, a first reference signal configuration associated with the half duplex portion 230-*a* is different than a second reference signal configuration associated with the full duplex portion 230-*b*. For example, each of the half duplex portion 230-*a* and the full duplex portion 230-*b* of the TTI 225 may correspond to separate reference signal densities in a time domain or a frequency domain, or both. The base station 105 may transmit, and the UE 115 may receive, the reference signal configurations in an RRC message, a MAC-CE message, or a DCI message, or a combination thereof.

As described, in some cases, the base station 105 and the UE 115 may determine and select different beams (e.g., downlink beams, uplink beams) to decrease or mitigate self-interference experienced at the base station 105 and the UE 115 when transferring operation from a half duplex mode to a full duplex mode, or vice versa. However, switching beams (e.g., downlink beams, uplink beams) may result in added latency to the wireless communication 220 between the base station 105 and the UE 115. In some cases, even if the base station 105 and the UE 115 change to an effective beam pair (e.g., downlink beams, uplink beams) with minimum self-interference, the base station 105 and the UE 115 may still experience issues precoding selection (with different beam pairs). The wireless communications system 200 provides improvements to the operation of the base station 105 and the UE 115 by reducing or eliminating self-interference experienced at the base station 105 and the UE 115 by implementing precoding operations specific to when the base station 105 and the UE 115 are operating in a half duplex mode and a full duplex mode. Thus, use of separate precoding matrices when operating in a half duplex mode and a full duplex mode may reduce self-interference.

Figure 3:
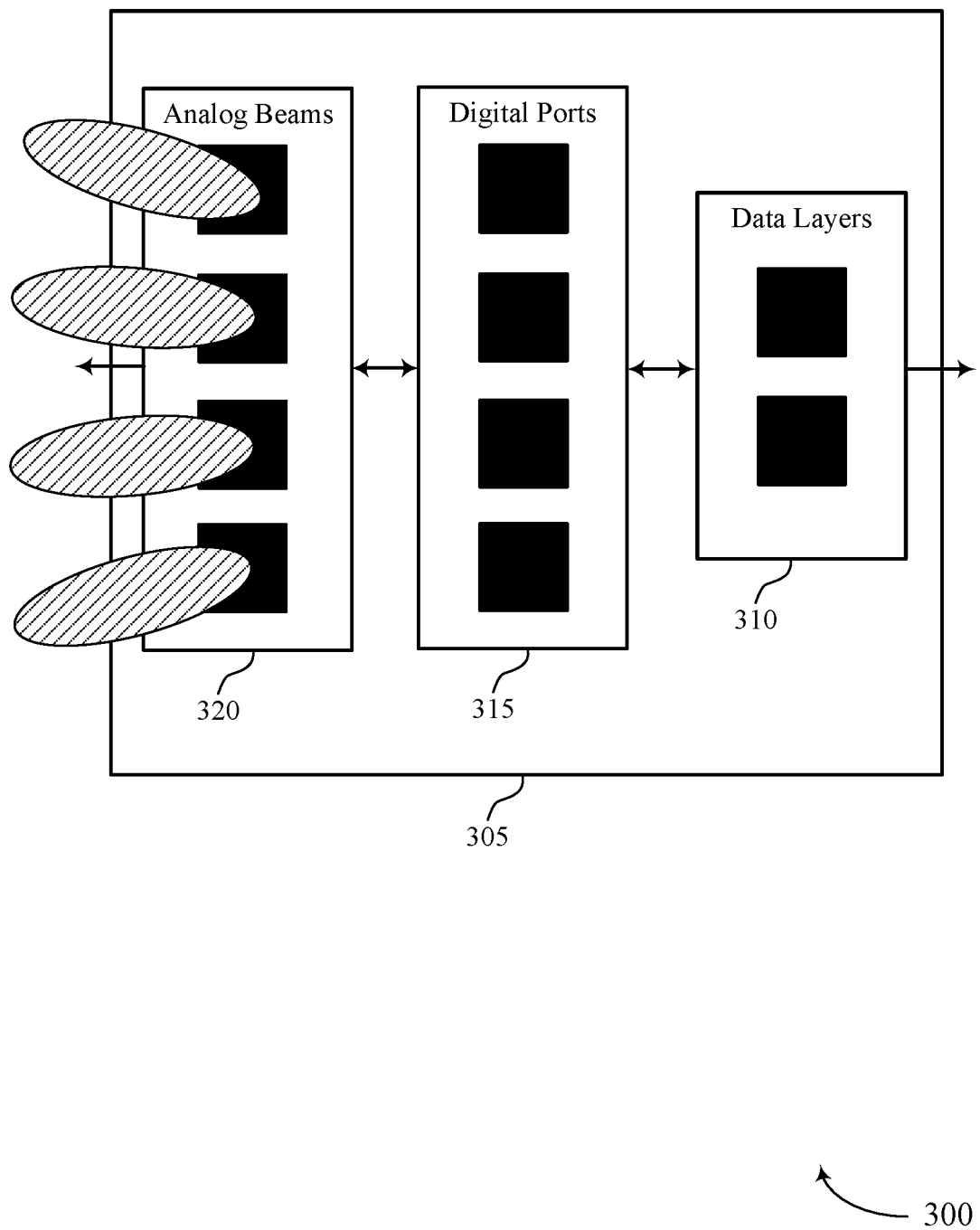
FIG. 3 shows a block diagram of a device that supports techniques for precoding in full duplex wireless communications systems in accordance with one or more aspects of the present disclosure.

FIG. 3 shows a block diagram 300 of a device 305 that supports techniques for precoding in full duplex wireless communications systems in accordance with one or more aspects of the present disclosure. The device 305 may be an example of aspects of a base station 105 or a UE 115 as described herein. The device 305 may include one or more data layers 310, one or more digital ports 315, and one or more analog beams 320. The device 305 may also include a processor. Each of these components may be in communication with one another (e.g., via one or more buses). The device 305 may support a precoding operation. In some examples, the device 305 may determine how the one or more data layers 310 are mapped to one or more different digital ports 315. In some cases, a number of digital ports 315 may greater than or less than a number of data layers 310. In some cases, the device 305 may use more digital ports 315 than data layers 310 to improve transmit diversity or receive diversity, or both. As described herein, each data layer 310 may also be referred to as a data stream. Each digital port 315 may be connected to different analog beams 320 from antenna arrays or polarizations.

The device 305 may support a precoding operation based on feedback from another device (e.g., a UE 115). The device 305 may transmit one or more reference signals (e.g., CSI-RS), and based on these reference signals the other device (e.g., a UE 115) may determine a preferred PMI or a preferred RI, or both. The device 305 may determine a number of data streams (i.e., a number of data layers 310 to user for wireless communications (e.g., downlink communications, uplink communications) with the other device (e.g., a UE 115)). In some cases of point-to-point transmission mode, a precoding matrix and a rank of transmission may be determined to maximize a sum rate. For instance, the device 305 may select singular vectors corresponding to top K singular values of effective channel matrix. However, when considering interference, a better option may be the precoding matrix (e.g., in FIG. 3, a 4-by-2 precoding matrix) that can also reduce interference. The device 305 may obtain the precoding matrix generated from normal singular value decomposition, and then perform some nulling, (e.g. projecting to the null space of interference), to obtain a precoding matrix that reduces interference), as described herein.

FIG. 4 illustrates an example of a downlink and uplink configuration 400 that supports techniques for precoding in full duplex wireless communications systems in accordance with one or more aspects of the present disclosure. The downlink and uplink configuration 400 may implement aspects of the wireless communications system 100 and the wireless communications system 200 described with reference to FIGS. 1 and 2, respectively. In the example of FIG. 4, a base station 105 or a UE 115, or both, may operate in a half duplex mode or a full duplex mode, or a combination thereof. For example, the downlink and uplink configuration 400 may be based on a configuration by a base station 105 and implemented by the base station 105 or a UE 115, or both, to promote power saving for the UE 115 when operating in a full duplex mode. The downlink and uplink configuration 400 may be based on a configuration by a base station 105 and implemented by a UE 115 to promote power saving for the UE 115 when operating in a full duplex mode. The downlink and uplink configuration 400 may also be based on a configuration by a base station 105 and implemented by the base station 105 or the UE 115, or both, to promote high reliability and low latency wireless communications, among others.

In the example of FIG. 4, a base station 105 or a UE 115, or both, may operate in a half duplex mode during a half duplex portion 415-*a* of a TTI 405. For example, a base station 105 or a UE 115, or both, may operate in a half duplex mode between $TTI_N$ and $TTI_{N+1}$. In the half duplex portion 415-*a* of the TTI 405 (e.g., between $TTI_N$ and $TTI_{N+1}$), a base station 105 may transmit a downlink transmission 410 (e.g., DCI, downlink data) based on one or more downlink resources (e.g., symbols, mini-slots, slots, subframe, frames, subcarriers, carriers, etc.), and the UE 115 may receive the downlink transmission 410 based on the one or more downlink resources.

A base station 105 or a UE 115, or both, may also operate in a full duplex mode during a full duplex portion 415-*b* of the TTI 405. For example, a base station 105 or a UE 115, or both, may operate in a full duplex mode between $TTI_{N+1}$ and $TTI_{N+2}$ of the TTI 405. A base station 105 may transmit, to a UE 115, an RRC message including a grant allocating an uplink transmission 420. In some examples, a base station 105 may transmit, to a UE 115, a DCI message activating or deactivating the grant allocating one or more uplink resources (e.g., symbols, mini-slots, slots, subframe, frames, subcarriers, carriers, etc.) associated with the uplink transmission 420. An uplink transmission 420 may thereby be preconfigured during the TTI 405 (e.g., a downlink slot, an uplink slot).

Data traffic, for example, downlink traffic associated with the downlink transmission 410 and uplink traffic associated with the uplink transmission 420 may be imbalanced. As such, uplink data (e.g., an uplink report) may need a fraction of the TTI 405 (e.g., a mini-slot, a slot), while the remainder of the TTI 405 (e.g., a mini-slot, a slot) is for the downlink transmission 410. For example, the uplink transmission 420 may be for a short but urgent reporting (e.g., channel status information (CSI) reporting). Thus, a UE 115 may be configured to transmit an uplink transmission 420 to a base station 105, while a downlink transmission 410 is on-going. This may reduce latency for uplink reporting by the UE 115. Thus, a UE 115 may, if enabled, receive downlink transmissions from and transmit uplink transmissions to transmission-reception points (TRPs).

The downlink transmission 410 and the uplink transmission 420 may, in some cases, use a same tone or different tones. Here, self-interference might still matter even in different tones. A base station 105 and a UE 115 may thus be configured to use separate precoding matrices, among other parameters, while the base station 105 and the UE 115 is operating in a half duplex mode or a full duplex mode, as described herein.

Figure 5:
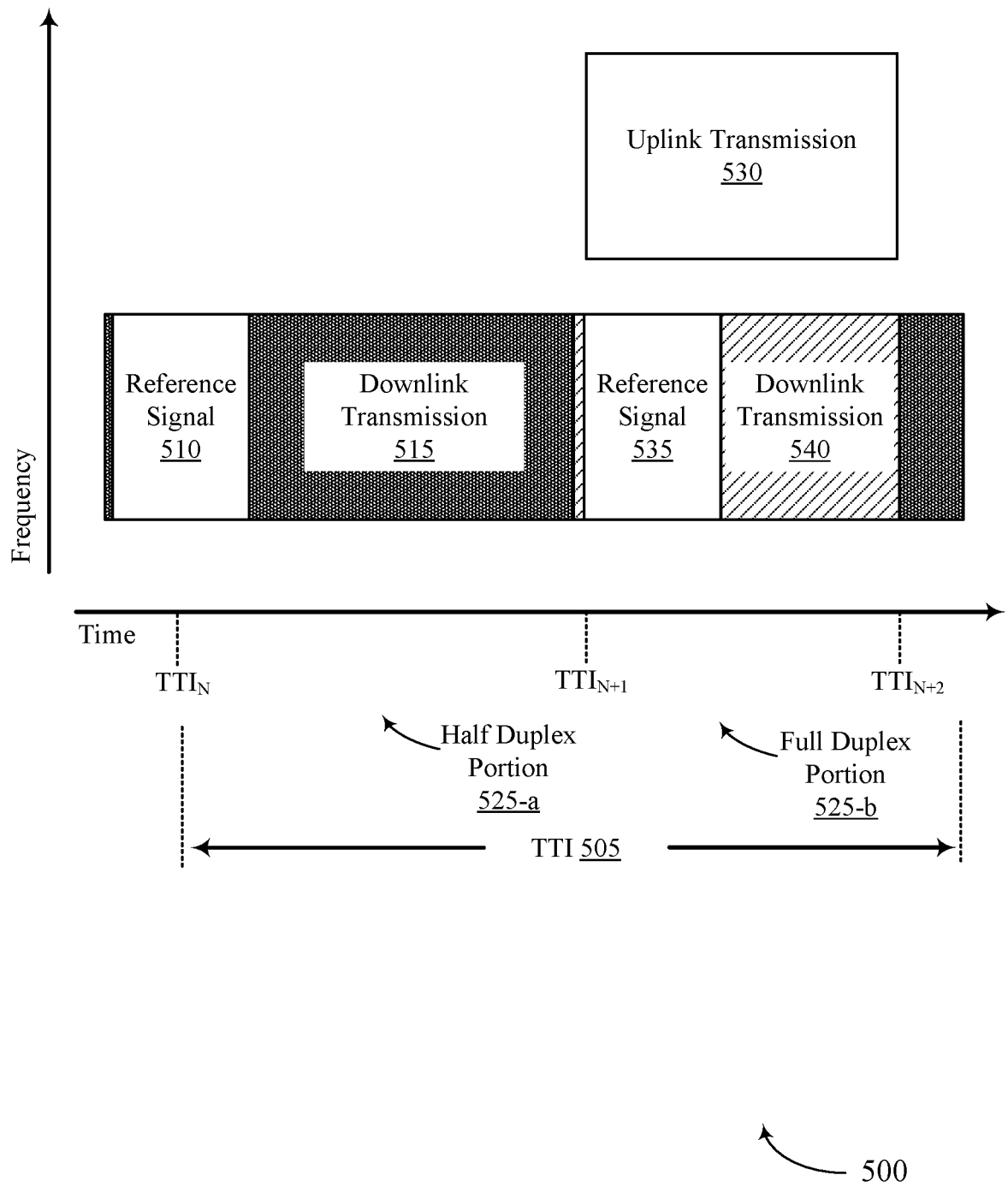

FIG. 5 illustrates an example of a downlink and uplink configuration 500 that supports techniques for precoding in full duplex wireless communications systems in accordance with one or more aspects of the present disclosure. The downlink and uplink configuration 500 may implement aspects of the wireless communications system 100 and the wireless communications system 200 described with reference to FIGS. 1 and 2, respectively. In the example of FIG. 5, a base station 105 or a UE 115, or both, may operate in a half duplex mode or a full duplex mode, or a combination thereof. For example, the downlink and uplink configuration 500 may be based on a configuration by a base station 105 and implemented by the base station 105 or a UE 115, or both, to promote power saving for the UE 115 when operating in a full duplex mode. The downlink and uplink configuration 500 may be based on a configuration by a base station 105 and implemented by a UE 115 to promote power saving for the UE 115 when operating in a full duplex mode. The downlink and uplink configuration 500 may also be based on a configuration by a base station 105 and implemented by the base station 105 or the UE 115, or both, to promote high reliability and low latency wireless communications, among others.

In the example of FIG. 5, a base station 105 or a UE 115, or both, may operate in a half duplex mode during a half duplex portion 525-a of a TTI 505. For example, a base station 105 or a UE 115, or both, may operate in a half duplex mode between $TTI_N$ and $TTI_{N+1}$. In the half duplex portion 525-a of the TTI 505 (e.g., between $TTI_N$ and $TTI_{N+1}$), a base station 105 may transmit a reference signal 510 (e.g., a DMRS) associated with a downlink transmission 515 (e.g., DCI or data) based on one or more downlink resources, and the UE 115 may receive the downlink transmission 515 based on the reference signal 510 (e.g., a DMRS).

A base station 105 or a UE 115, or both, may also operate in a full duplex mode during a full duplex portion 525-b of the TTI 505. For example, a base station 105 or a UE 115, or both, may operate in a full duplex mode between $TTI_{N+1}$ and $TTI_{N+2}$ of the TTI 505. A base station 105 may transmit, to a UE 115, an RRC message including a grant allocating an uplink transmission 530. In some examples, a base station 105 may transmit, to a UE 115, a DCI message activating or deactivating one or more uplink resources associated with the uplink transmission 530. An uplink transmission 530 may thereby be preconfigured during the TTI 505 (e.g., a downlink slot, an uplink slot). A UE 115 may thus be configured to transmit an uplink transmission 530 to a base station 105, while a downlink transmission 540 is on-going.

In the example of FIG. 5, to reduce self-interference at a base station 105 or a UE 115, or both, different transmission parameters (e.g., a precoding parameter, a transmission rank parameter, a reference signal parameter, etc.) may be used for the half duplex portion 525-a of the TTI 505 and the full duplex portion 525-b of the TTI 505. As illustrated in FIG. 5, a base station 105 use a same or different reference signal 535 during the full duplex portion 525-b of the TTI 505. For example, in the full duplex portion 525-b of the TTI 505 (e.g., between TTIN and TTIN+1), a base station 105 may transmit another reference signal 535 (e.g., a DMRS) associated with a downlink transmission 540 (e.g., DCI or data) based on one or more downlink resources, and the UE 115 may receive the downlink transmission 540 based on the reference signal 535.

A base station 105 or a UE 115, or both, may use a first set of parameters corresponding to a first parameter value (e.g., an MCS, a PMI, an RI, a transmission configuration indicator (TCI) state, etc.) during a half duplex portion 525-a of the TTI 505 and a second set of parameters corresponding to a second parameter value (e.g., an MCS, a PMI, an RI, a TCI state, etc.) during the full duplex portion 525-b of the TTI 505. For example, a base station 105 or a UE 115, or both, may perform wireless communications according to a first PMI or a first RI, or both, during the half duplex portion 525-a of the TTI 505 and a second PMI or a second RI, or both, during the full duplex portion 525-b of the TTI 505. In some other examples, a base station 105 or a UE 115, or both, may use a first TCI state (e.g., a first downlink and uplink beam pair) during the half duplex portion 525-a of the TTI 505 and a second TCI state (e.g., a second downlink and uplink beam pair) during the full duplex portion 525-b of the TTI 505. A base station 105 or a UE 115, or both, may In the example of FIG. 5, the half duplex portion 525-a and the full duplex portion 525-b of the TTI 505 may correspond to separate reference signals, as described in FIGS. 1 through 4, respectively. Examples of reference signals include a DMRS, a PTRS, an SRS, a CSI-RS, among other examples. These separate reference signals may be precoded with a same precoding matrix as downlink and uplink data in each portion 525 of the TTI 505. For example, a first reference signal (e.g., reference signal 510) associated with the half duplex portion 525-a of the TTI 505 may be precoded based on a first precoding matrix (e.g., a 4-by-2 precoding matrix), and a second reference signal (e.g., reference signal 535) associated with the full duplex portion 525-b of the TTI 505 may be precoded based on the second precoding matrix (e.g., a 4-by-1 precoding matrix). A base station 105 or a UE 115, or both, may for example transmit or receive a single data stream during the full duplex portion 525-b of the TTI 505, and two or more data streams during the half duplex portion 525-a of the TTI 505. In other words, a base station 105 or a UE 115, or both, may transmit or receive fewer data streams during the full duplex portion 525-b of the TTI 505 compared to the half duplex portion 525-a of the TTI 505

Additionally, or alternatively, in the example of FIG. 5, the half duplex portion 525-a and the full duplex portion 525-b of the TTI 505 may correspond to separate reference signal configurations. In other words, a first reference signal configuration associated with the half duplex portion 525-a is different than a second reference signal configuration associated with the full duplex portion 525-b. For example, each of the half duplex portion 525-a and the full duplex portion 525-b of the TTI 505 may correspond to separate reference signal densities in a time domain or a frequency domain, or both. The base station 105 may transmit, and the UE 115 may receive, the reference signal configurations in an RRC message, a MAC-CE message, or a DCI message, or a combination thereof.

A base station 105 and a UE 115 may be configured to determine an overlap portion between the half duplex portion 525-a of the TTI 505 and the full duplex portion 525-b of the TTI 505 in a time domain. The overlapped portion may include time resources (e.g., one or more symbols, mini-slot, slots) where both downlink and uplink communications happen during the TTI 505. In some examples, one or more additional time resources (e.g., one or more symbols, mini-slot, slots) before and after the full duplex portion 525-b may be affected by self-interference (e.g., neighboring symbols), for example, at a base station 105 or a UE 115, or both. A base station 105 or a UE 115, or both, may be configured to use a precoding matrix associated with the full duplex portion 525-b for one or more resources (e.g., symbols) associated with the half duplex portion 525-a. For example, a base station 105 or a UE 115, or both, may be configured to use a precoding matrix during at least one OFDM symbol after and before the full duplex portion 525-b. Thus, a base station 105 or a UE 115, or both, may apply the configuration of the second precoder or number of data streams (i.e., the full duplex configuration) to the determined overlap portion.

Figure 6:
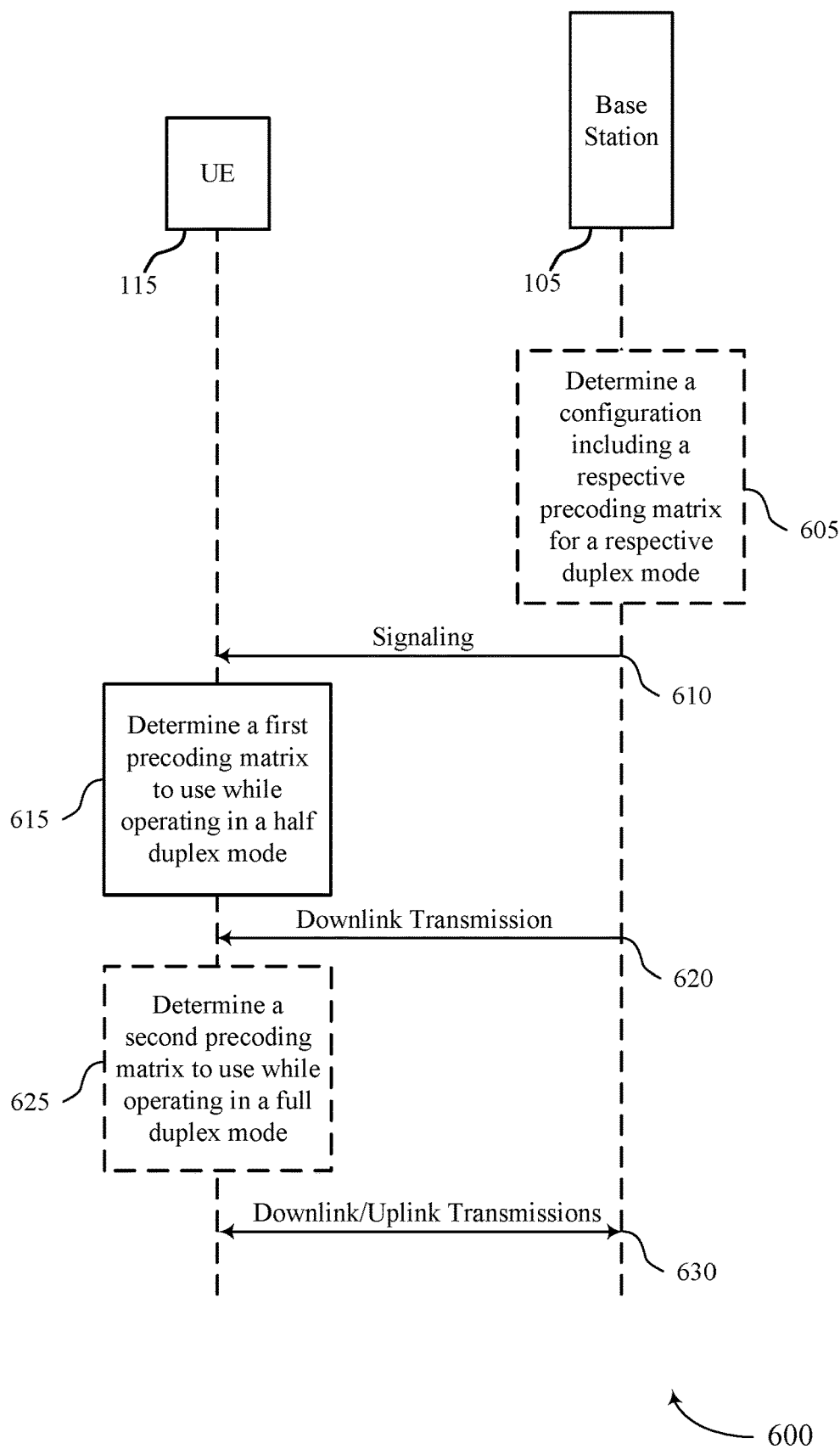
FIG. 6 illustrates an example of a process flow that supports techniques for precoding in full duplex wireless communications systems in accordance with one or more aspects of the present disclosure.

FIG. 6 illustrates an example of a process flow 600 that supports techniques for precoding in full duplex wireless communications systems in accordance with one or more aspects of the present disclosure. The process flow 600 may implement aspects of the wireless communications system 100 and the wireless communications system 200 described with reference to FIGS. 1 and 2, respectively. In the example of FIG. 6, a UE 115 may operate in a half duplex mode or a full duplex mode, or a combination thereof. The process flow 600 may be based on a configuration by a base station 105 and implemented by a UE 115 to promote power saving for the UE 115 when operating in a full duplex mode. The process flow 600 may also be based on a configuration by the base station 105 and implemented by the UE 115 to promote high reliability and low latency wireless communications, among others.

In the following description of the process flow 600, the operations between the base station 105 and the UE 115 may be transmitted in a different order than the example order shown, or the operations performed by the base station 105 and the UE 115 may be performed in different orders or at different times. Some operations may also be omitted from the process flow 600, and other operations may be added to the process flow 600. The base station 105 and the UE 115 may be examples of a base station 105 and a UE 115 as described with reference to FIGS. 1 and 2, respectively.

At 605, the base station 105 may determine a configuration including a respective precoding matrix for a respective duplex mode. For example, the base station 105 may determine for the UE 115 to use a first precoding matrix associated with wireless communication (e.g., downlink communications, uplink communications) while operating in a half duplex mode during a first portion of a TTI and a second precoding matrix to use for the wireless communication (e.g., downlink communications, uplink communications) while operating in a full duplex mode during a second portion of the TTI. The second precoding matrix is different than the first precoding matrix. At 610, the base station 105 may transmit, to the UE 115, via signaling an indication of the configuration. For example, the base station may transmit an RRC message, a MAC-CE message, or a DCI message, or a combination thereof, which carries the indication of the configuration.

At 615, the UE 115 may determine a first precoding matrix to use while operating in a half duplex mode, for example, during a first portion of a TTI. At 620, the base station 105 may transmit, and the UE 115 may receive, a downlink transmission based on the first precoding matrix while operating in a half duplex mode during a first portion of a TTI. At 625, the UE 115 may determine a second precoding matrix to use while operating in a full duplex mode, for example, during a second portion of the TTI. At 630, the UE 115 may transmit uplink transmissions to the base station 105, as well as receive downlink transmissions from the base station 105 based on the second precoding matrix, as described herein.

Figure 7:
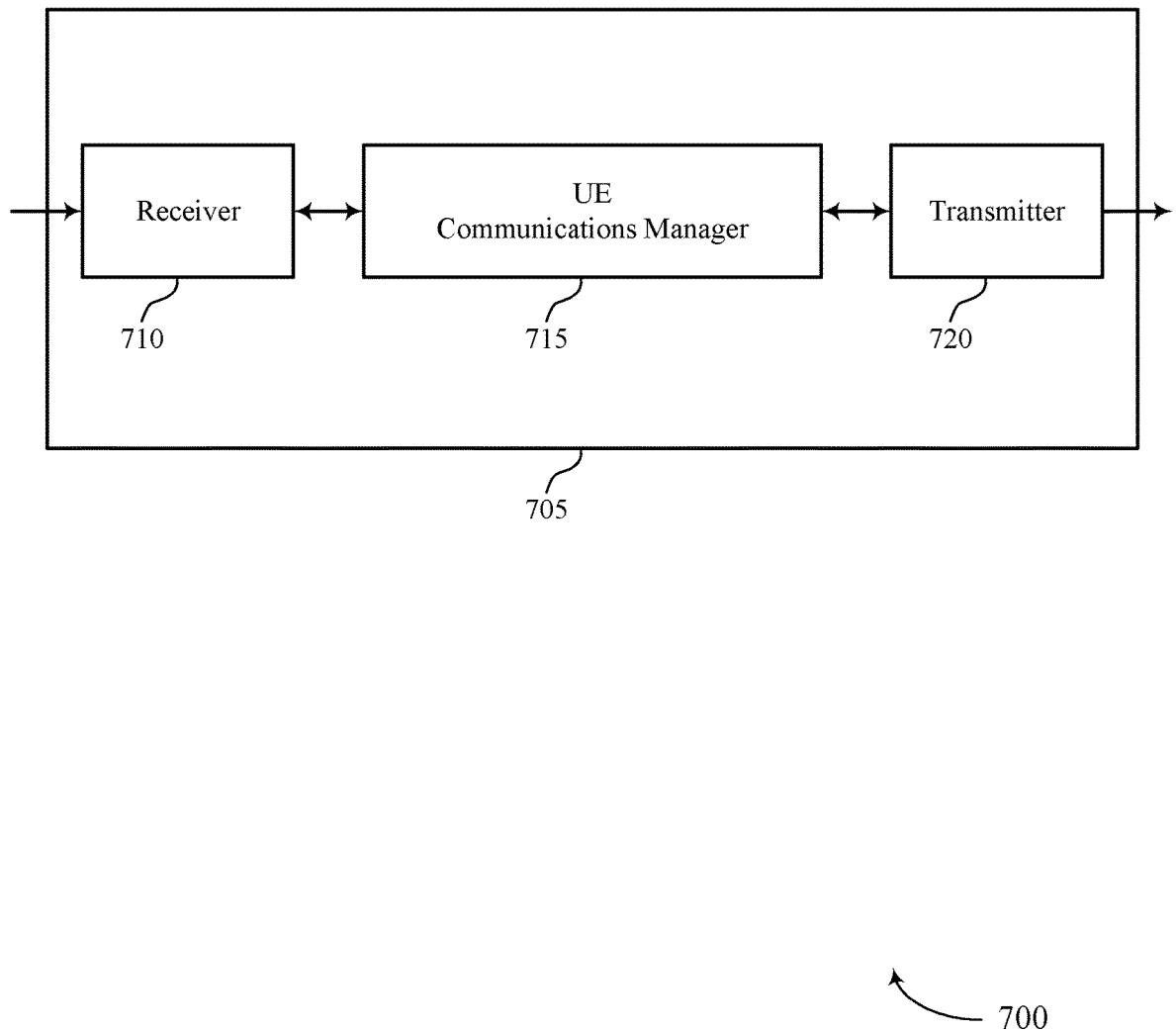
FIGS. 7 and 8 show block diagrams of devices that support techniques for precoding in full duplex wireless communications systems in accordance with one or more aspects of the present disclosure.

FIG. 7 shows a block diagram 700 of a device 705 that supports techniques for precoding in full duplex wireless communications systems in accordance with one or more aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for precoding in full duplex wireless communications systems, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may be implemented as an integrated circuit or chipset for the device 705, and the receiver 710 and the transmitter 720 may be implemented as analog components (for example, amplifiers, filters, antennas) coupled with the device 705 modem to enable wireless transmission and reception. The actions performed by the UE communications manager 715 as described herein may be implemented to realize one or more potential aspects. At least one implementation may enable the UE communications manager 715 to support use of separate precoding matrices, among other parameters, while the device 705 is operating in a half duplex mode or a full duplex mode. For example, the UE communications manager 715 may determine a first precoding matrix associated with wireless communication while operating in a half duplex mode during a first portion of a TTI, and determine a second precoding matrix to use for the wireless communication while operating in a full duplex mode during a second portion of the TTI, where the second precoding matrix is different from the first precoding matrix. The UE communications manager 715 may thereby perform the wireless communication based on the second precoding matrix while operating in the full duplex mode during the second portion of the TTI.

In some cases, the UE communications manager 715 may operate in a half duplex mode during a first portion of a TTI, wherein a first precoding matrix is used for the wireless communication when in the half duplex mode and operate in a full duplex mode during a second portion of the TTI, a second precoding matrix used for the wireless communication when in the full duplex mode, wherein the second precoding matrix is different from the first precoding matrix. The UE communications manager 715 may thereby perform the wireless communication based on the second precoding matrix when in the full duplex mode during the second portion of the TTI. The UE communications manager 715 may be an example of aspects of the UE communications manager 1010 described herein.

The UE communications manager 715 may be an example of means for performing various aspects of managing precoding wireless communications in full duplex wireless communications systems as described herein. The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signaling processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure. In some examples, the UE communications manager 715 may be configured to perform various operations (e.g., receiving, determining, selecting, transmitting) using or otherwise in cooperation with the receiver 710, the transmitter 720, or both.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
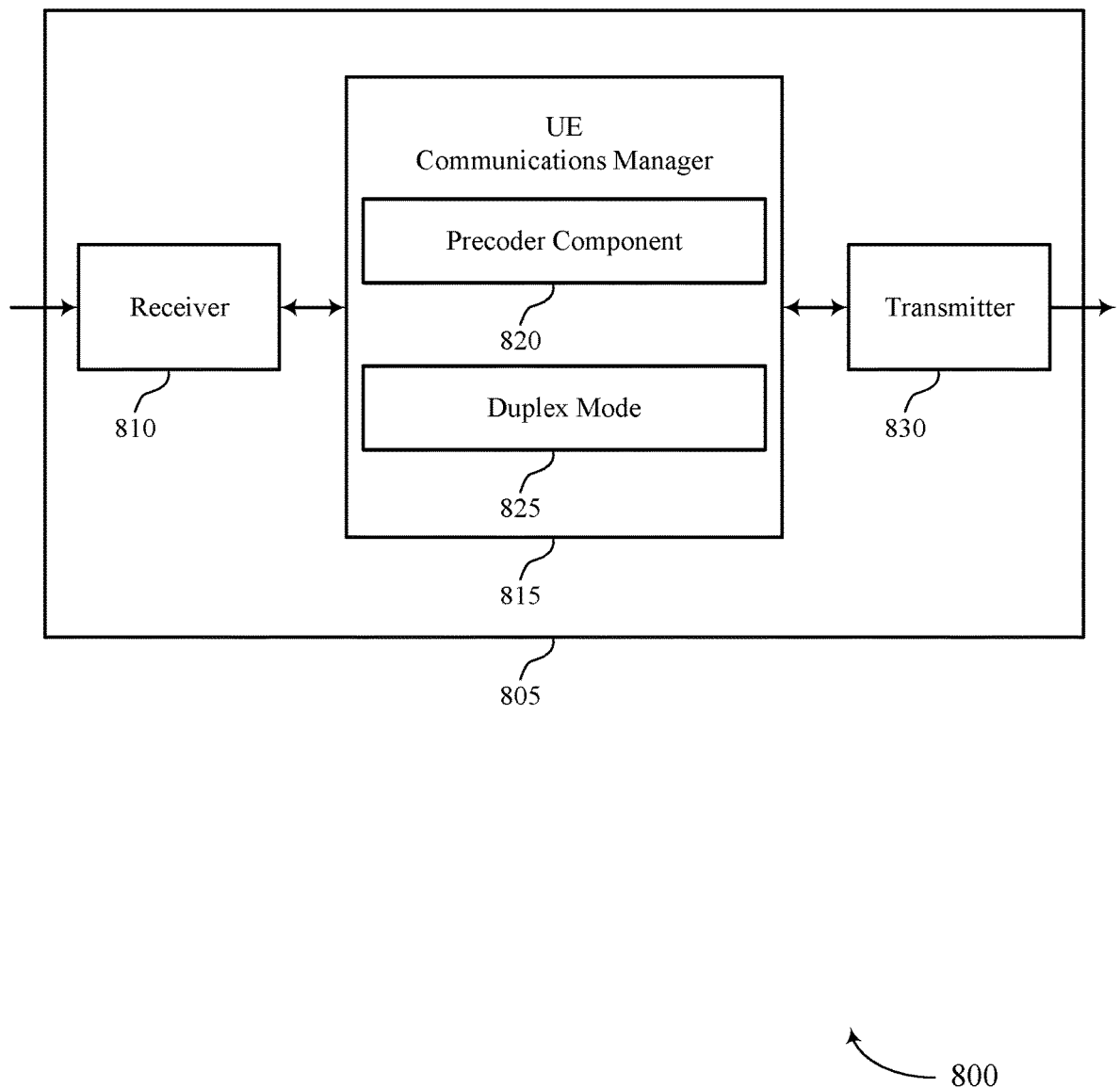

FIG. 8 shows a block diagram 800 of a device 805 that supports techniques for precoding in full duplex wireless communications systems in accordance with one or more aspects of the present disclosure. The device 805 may be an example of aspects of a device 705, or a UE 115 as described herein. The device 805 may include a receiver 810, a UE communications manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to techniques for precoding in full duplex wireless communications systems, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a precoder component 820 and a duplex mode 825. The UE communications manager 815 may be an example of aspects of the UE communications manager 1010 described herein. The precoder component 820 may determine a first precoding matrix associated with wireless communication while operating in a half duplex mode during a first portion of a TTI and determine a second precoding matrix to use for the wireless communication while operating in a full duplex mode during a second portion of the TTI, where the second precoding matrix is different from the first precoding matrix. The duplex mode 825 may perform the wireless communication based on the second precoding matrix while operating in the full duplex mode during the second portion of the TTI.

In some cases, the precoder component 820 may operate in a half duplex mode during a first portion of a TTI, wherein a first precoding matrix is used for the wireless communication when in the half duplex mode and operate in a full duplex mode during a second portion of the TTI, a second precoding matrix used for the wireless communication when in the full duplex mode, wherein the second precoding matrix is different from the first precoding matrix. The duplex mode 825 may perform the wireless communication based on the second precoding matrix when in the full duplex mode during the second portion of the TTI.

The transmitter 830 may transmit signals generated by other components of the device 805. In some examples, the transmitter 830 may be collocated with a receiver 810 in a transceiver component. For example, the transmitter 830 may be an example of aspects of the transceiver 1020 described with reference to FIG. 10. The transmitter 830 may utilize a single antenna or a set of antennas.

Figure 9:
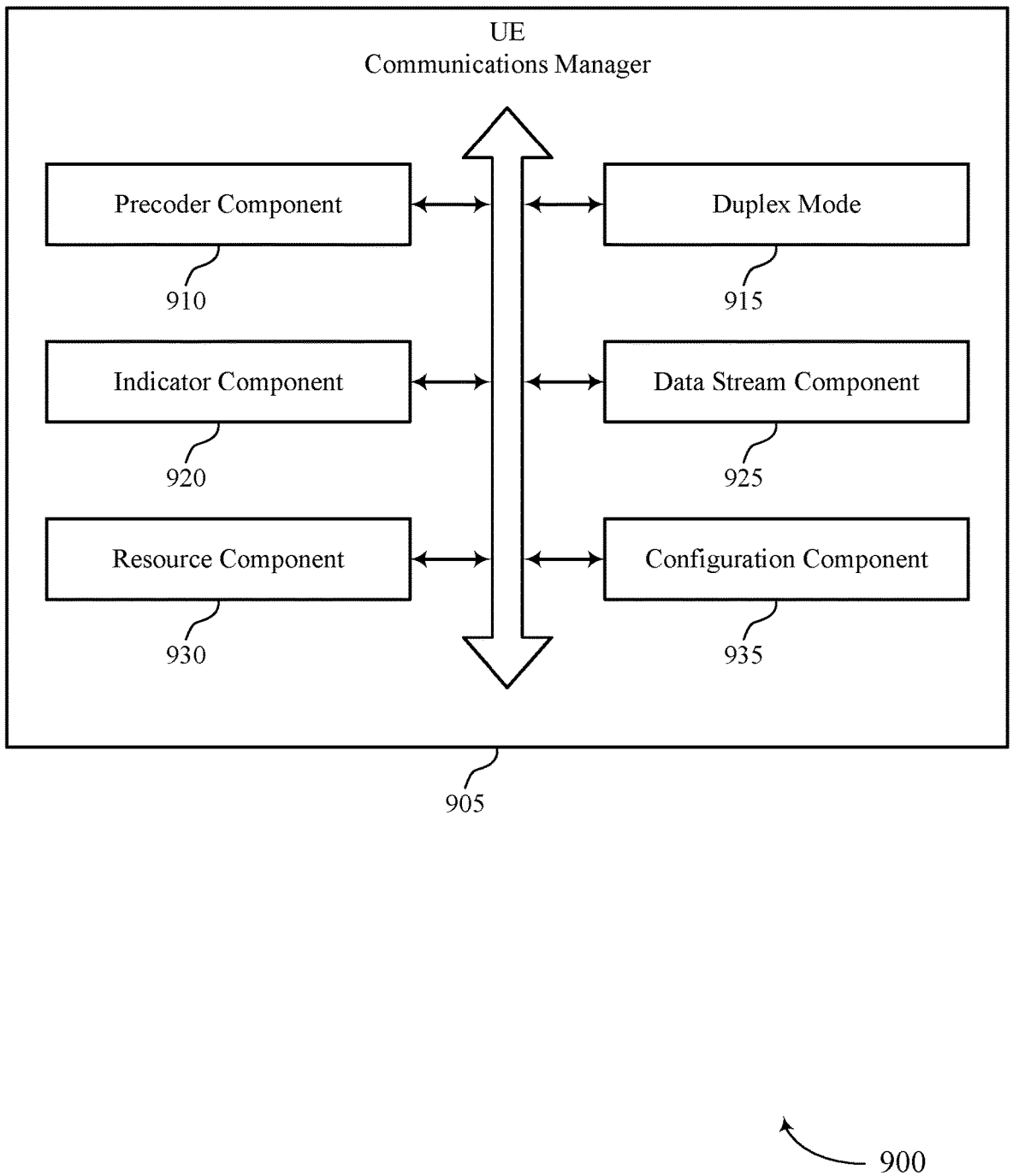
FIG. 9 shows a block diagram of a UE communications manager that supports techniques for precoding in full duplex wireless communications systems in accordance with one or more aspects of the present disclosure.

FIG. 9 shows a block diagram 900 of a UE communications manager 905 that supports techniques for precoding in full duplex wireless communications systems in accordance with one or more aspects of the present disclosure. The UE communications manager 905 may be an example of aspects of a UE communications manager 715, a UE communications manager 815, or a UE communications manager 1010 described herein. The UE communications manager 905 may include a precoder component 910, a duplex mode 915, an indicator component 920, a data stream component 925, a resource component 930, and a configuration component 935. Each of these components may communicate, directly or indirectly, with one another (e.g., via one or more buses).

The precoder component 910 may determine a first precoding matrix associated with wireless communication while operating in a half duplex mode during a first portion of a TTI. In some examples, the precoder component 910 may determine a second precoding matrix to use for the wireless communication while operating in a full duplex mode during a second portion of the TTI. The second precoding matrix may be different from the first precoding matrix.

The precoder component 910 may determine a first PMI or a first RI, or both, associated with the wireless communication while operating in the half duplex mode, where determining the first precoding matrix associated with the wireless communication while operating in the half duplex mode during the first portion of the TTI is based on determining the first PMI or the first RI, or both. In some examples, the precoder component 910 may determine a second PMI or a second RI, or both, associated with the wireless communication while operating in the full duplex mode, where determining the second precoding matrix associated with the wireless communication while operating in the full duplex mode during the second portion of the TTI is based on determining the second PMI or the second RI, or both. The precoder component 910 may transmit a message including an indication of the PMI or the RI, or both via a physical uplink channel, where the physical uplink channel includes a physical uplink control channel or a physical uplink shared channel.

In some cases, the precoder component 910 determine a first PMI or a first RI, or both while operating in a half duplex mode during a first portion of a TTI, wherein a first precoding matrix is used for the wireless communication while operating in the half duplex mode and the precoder component 910 determine a second PMI or a second RI, or both while operating in a full duplex mode during a second portion of the TTI, a second precoding matrix used for the wireless communication while operating in the full duplex mode, wherein the second precoding matrix is different from the first precoding matrix. The precoder component 910 may transmit a message including an indication of the PMI or the RI, or both via a physical uplink channel, where the physical uplink channel includes a physical uplink control channel or a physical uplink shared channel.

The first portion of the TTI and the second portion of the TTI include separate reference signals. In some cases, a first reference signal associated with the first portion of the TTI is precoded based on the first precoding matrix. In some cases, a second reference signal associated with the second portion of the TTI is precoded based on the second precoding matrix. In some cases, a reference signal associated with the first portion of the TTI or the second portion of the TTI, or both, includes a DMRS, a PTRS, an SRS, or a CSI-RS, or a combination thereof. In some cases, the first portion of the TTI and the second portion of the TTI correspond to separate reference signal configurations including a reference signal density in a time domain or a frequency domain, or both, where the reference signal configurations are received in a RRC message, a MAC-CE message, or a DCI message, or a combination thereof. In some cases, a first reference signal configuration associated with the first portion of the TTI is different than a second reference signal configuration associated with the second portion of the TTI.

The duplex mode 915 may perform the wireless communication based on the second precoding matrix while operating in the full duplex mode during the second portion of the TTI. In some cases, the wireless communication includes downlink wireless communications. In some cases, the wireless communication includes uplink wireless communications. In some cases, the TTI includes a mini-slot. In some cases, the TTI includes a slot.

The indicator component 920 may receive an indication to use the first precoding matrix associated with the wireless communication while operating in the half duplex mode during the first portion of a TTI, or the second precoding matrix for the wireless communication while operating in the full duplex mode during the second portion of the TTI, or both. In some examples, the indicator component 920 may receive a RRC message including the indication to use the first precoding matrix associated with the wireless communication while operating in the half duplex mode during the first portion of a TTI, or the second precoding matrix for the wireless communication while operating in the full duplex mode during the second portion of the TTI, or both. In some examples, the indicator component 920 may receive a MAC-CE message including the indication to use the first precoding matrix associated with the wireless communication while operating in the half duplex mode during the first portion of a TTI, or the second precoding matrix for the wireless communication while operating in the full duplex mode during the second portion of the TTI, or both. In some examples, the indicator component 920 may receive a DCI message including the indication to use the first precoding matrix associated with the wireless communication while operating in the half duplex mode during the first portion of a TTI, or the second precoding matrix for the wireless communication while operating in the full duplex mode during the second portion of the TTI, or both.

The data stream component 925 may determine a first number of data streams associated with the wireless communication while operating in the half duplex mode during the first portion of the TTI. The data stream component 925 may determine a second number of data streams to use for the wireless communication while operating in the full duplex mode during the second portion of the TTI, where the second number of data streams is different than the first number of data streams, where performing the wireless communication includes. In some examples, the data stream component 925 may perform the wireless communication based on the second precoding matrix or the second number of data streams, or both, while operating in the full duplex mode during the second portion of the TTI. In some examples, the data stream component 925 may transmit or receiving multiple data streams while operating in the half duplex mode during the first portion of the TTI based on the first number of data streams. In some examples, the data stream component 925 may transmit or receiving a single data stream while operating in the full duplex mode during the second portion of the TTI based on the second number of data streams.

The resource component 930 may determine an overlap portion between the first portion of the TTI and the second portion of the TTI in a time domain. In some examples, enabling a configuration during the overlap portion between the first portion of the TTI and the second portion of the TTI, the configuration includes a separate precoder or a separate number of data streams, or both, to use during the overlap portion. In some examples, the resource component 930 may determine a set of resources associated with using the second precoding matrix for the wireless communication while operating in the full duplex mode during the second portion of the TTI based on a configuration from a base station or a preconfigured rule, or both, where the configuration is received in a RRC message, a MAC-CE message, or a DCI message, or a combination thereof. In some cases, the first portion of the TTI exceeds the overlap portion with the second portion of the TTI in the time domain. In some cases, the set of resources includes a set of OFDM symbols. In some cases, the set of OFDM symbols includes at least one OFDM symbol before the second portion of the TTI or at least one OFDM symbol after the second portion of the TTI, or both.

The configuration component 935 may receive a message including a configuration including an indication for the UE to use the first precoding matrix associated with the wireless communication while operating in the half duplex mode during the first portion of a TTI and the second precoding matrix for the wireless communication while operating in the full duplex mode during a second portion of the TTI, wherein the message includes a RRC message, a MAC-CE message, or a DCI message, or a combination thereof.

Figure 10:
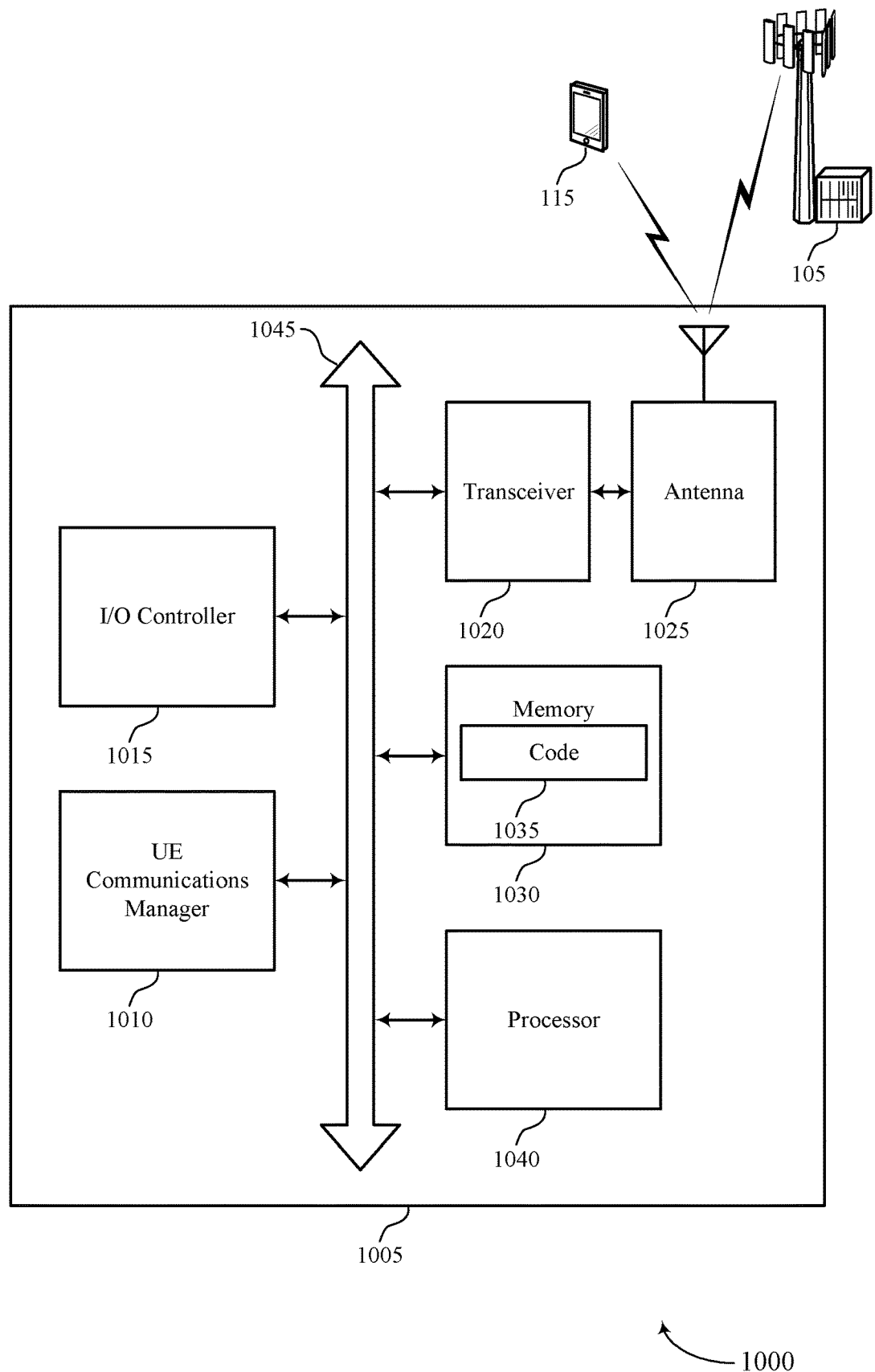
FIG. 10 shows a diagram of a system including a device that supports techniques for precoding in full duplex wireless communications systems in accordance with one or more aspects of the present disclosure.

FIG. 10 shows a diagram of a system 1000 including a device 1005 that supports techniques for precoding in full duplex wireless communications systems in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

At least one implementation may enable the UE communications manager 1010 to support use of separate precoding matrices, among other parameters, while the device 1005 is operating in a half duplex mode or a full duplex mode. For example, the UE communications manager 1010 may determine a first precoding matrix associated with the wireless communication while operating in a half duplex mode during a first portion of a TTI, determine a second precoding matrix to use for the wireless communication while operating in a full duplex mode during a second portion of the TTI, where the second precoding matrix is different from the first precoding matrix, and perform the wireless communication based on the second precoding matrix while operating in the full duplex mode during the second portion of the TTI. Based on implementing the use of separate precoding matrices, among other parameters, while the device 1005 is operating in a half duplex mode or a full duplex mode one or more processors of the device 1005 (for example, processor(s) controlling or incorporated with the UE communications manager 1010) may promote improvements to power consumption.

In some cases, the UE communications manager 1010 may operate in a half duplex mode during a first portion of a TTI, wherein a first precoding matrix is used for the wireless communication when in the half duplex mode and operate in a full duplex mode during a second portion of the TTI, a second precoding matrix used for the wireless communication when in the full duplex mode, wherein the second precoding matrix is different from the first precoding matrix and perform the wireless communication based on the second precoding matrix when in the full duplex mode during the second portion of the TTI. Based on implementing the use of separate precoding matrices, among other parameters, while the device 1005 is operating in a half duplex mode or a full duplex mode one or more processors of the device 1005 (for example, processor(s) controlling or incorporated with the UE communications manager 1010) may promote improvements to power consumption.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor 1040 to perform various functions described herein. In some cases, the memory 1030 may contain, among other things, a basic input/output system (BIOS) which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for precoding in full duplex wireless communications systems).

Figure 11:
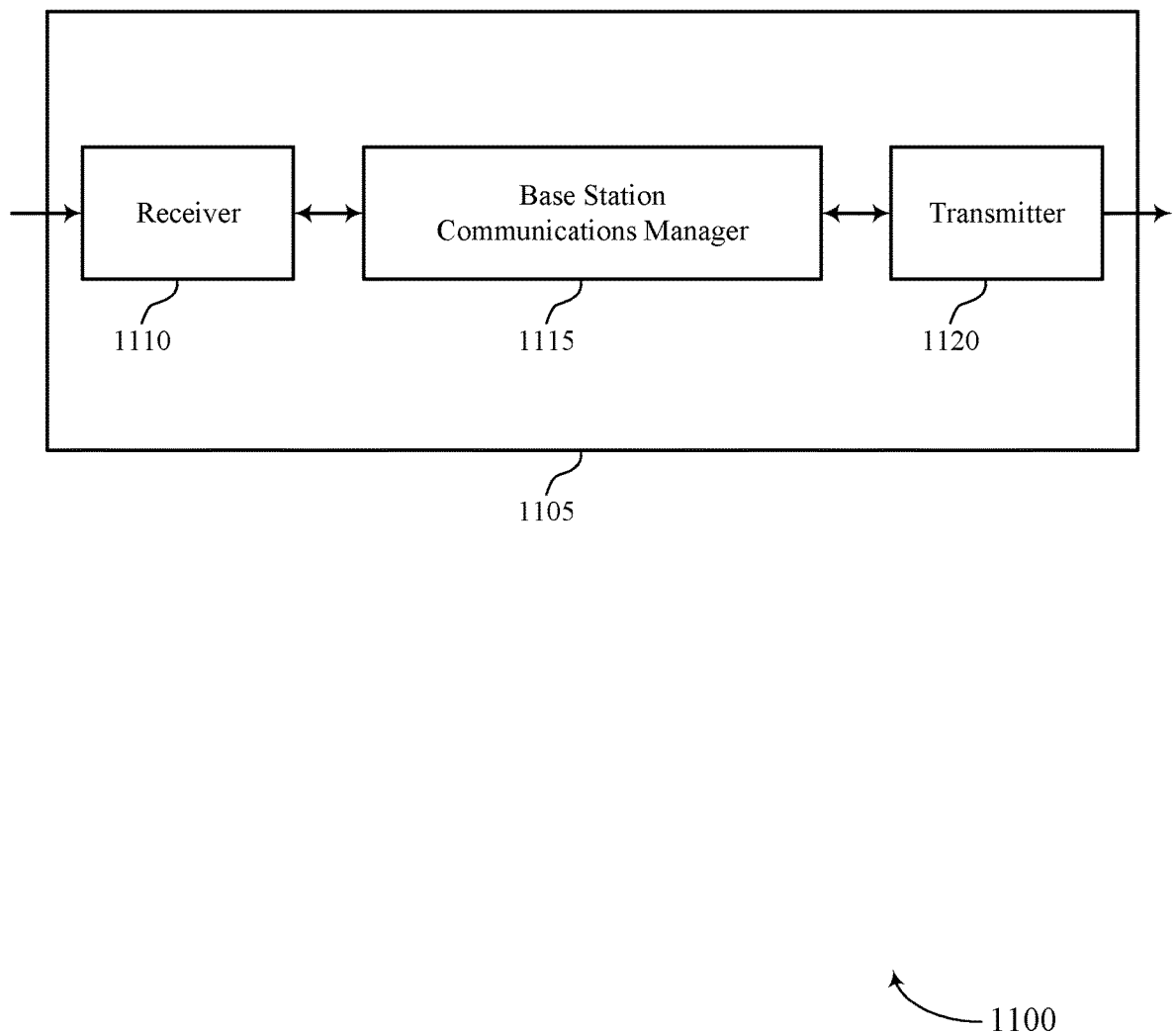
FIGS. 11 and 12 show block diagrams of devices that support techniques for precoding in full duplex wireless communications systems in accordance with one or more aspects of the present disclosure.

FIG. 11 shows a block diagram 1100 of a device 1105 that supports techniques for precoding in full duplex wireless communications systems in accordance with one or more aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for precoding in full duplex wireless communications systems, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may determine a configuration including an indication for a UE to use a first precoding matrix associated with wireless communication while operating in a half duplex mode during a first portion of a TTI and a second precoding matrix for the wireless communication while operating in a full duplex mode during a second portion of the TTI, where the second precoding matrix is different than the first precoding matrix and transmit, to the UE, the configuration. The base station communications manager 1115 may be an example of aspects of the base station communications manager 1410 described herein.

In some cases the base station communications manager 1115 may transmit, to a UE, signaling that indicates a configuration for the wireless communication, the configuration including an indication for the UE to use a first precoding matrix associated with the wireless communication when in a half duplex mode during a first portion of a TTI and a second precoding matrix for the wireless communication when in a full duplex mode during a second portion of the TTI, where the second precoding matrix is different than the first precoding matrix and communicate with the UE according to the configuration for the wireless communications. The base station communications manager 1115 may be an example of aspects of the base station communications manager 1410 described herein.

The base station communications manager 1115 may be an example of means for performing various aspects of managing precoding operations in full duplex wireless communications systems. The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
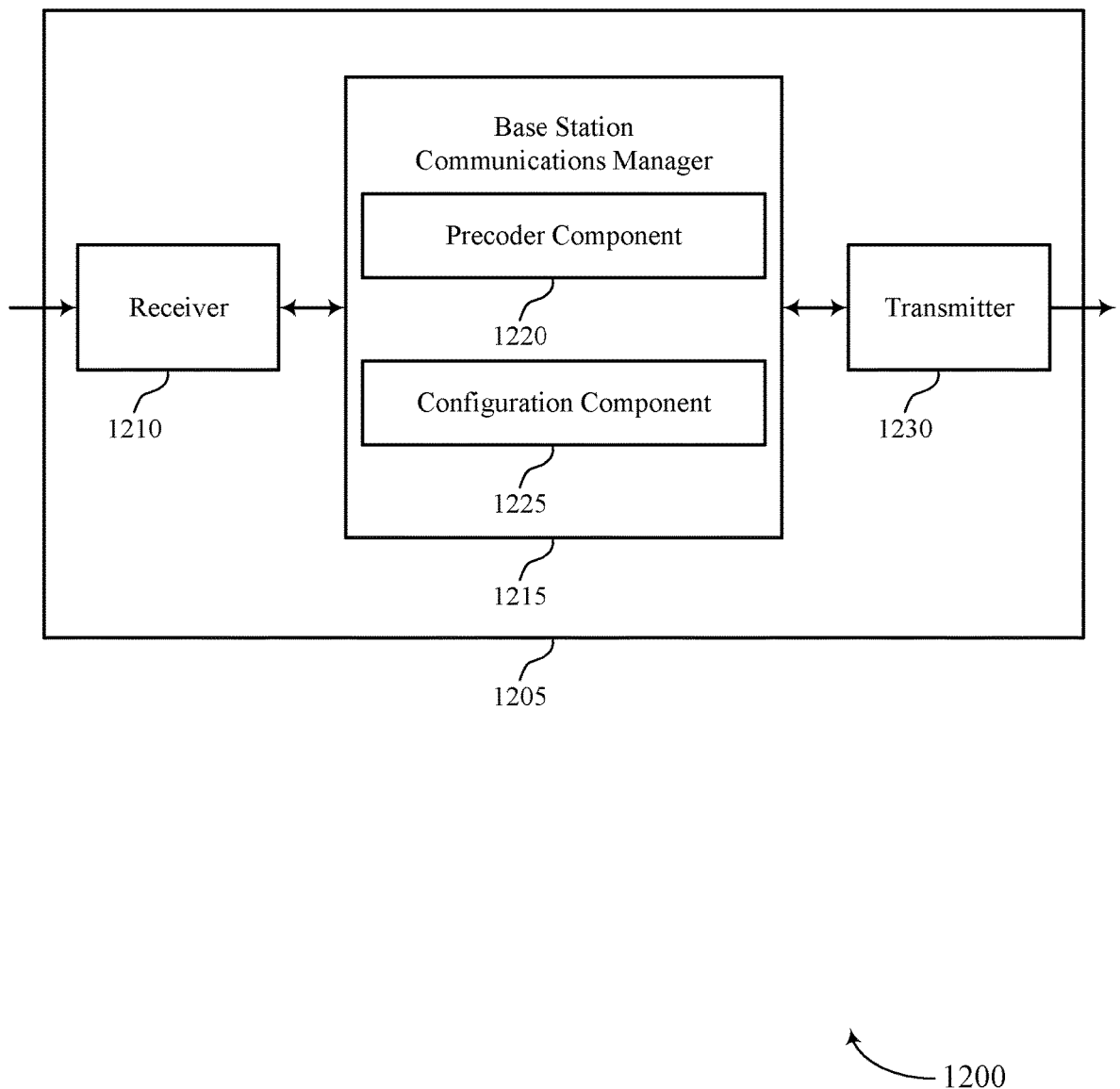

FIG. 12 shows a block diagram 1200 of a device 1205 that supports techniques for precoding in full duplex wireless communications systems in accordance with one or more aspects of the present disclosure. The device 1205 may be an example of aspects of a device 1105, or a base station 105 as described herein. The device 1205 may include a receiver 1210, a base station communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for precoding in full duplex wireless communications systems, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a precoder component 1220 and a configuration component 1225. The base station communications manager 1215 may be an example of aspects of the base station communications manager 1410 described herein. The precoder component 1220 may determine a configuration including an indication for a UE to use a first precoding matrix associated with wireless communication while operating in a half duplex mode during a first portion of a TTI and a second precoding matrix for the wireless communication while operating in a full duplex mode during a second portion of the TTI, where the second precoding matrix is different than the first precoding matrix. The configuration component 1225 may transmit, to the UE, the configuration.

In some cases the precoder component 1220 may transmit, to a UE, signaling that indicates a configuration for the wireless communication, the configuration including an indication for the UE to use a first precoding matrix associated with the wireless communication when in a half duplex mode during a first portion of a TTI and a second precoding matrix for the wireless communication when in a full duplex mode during a second portion of the TTI, where the second precoding matrix is different than the first precoding matrix. The configuration component 1225 may communicate with the UE according to the configuration for the wireless communications.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
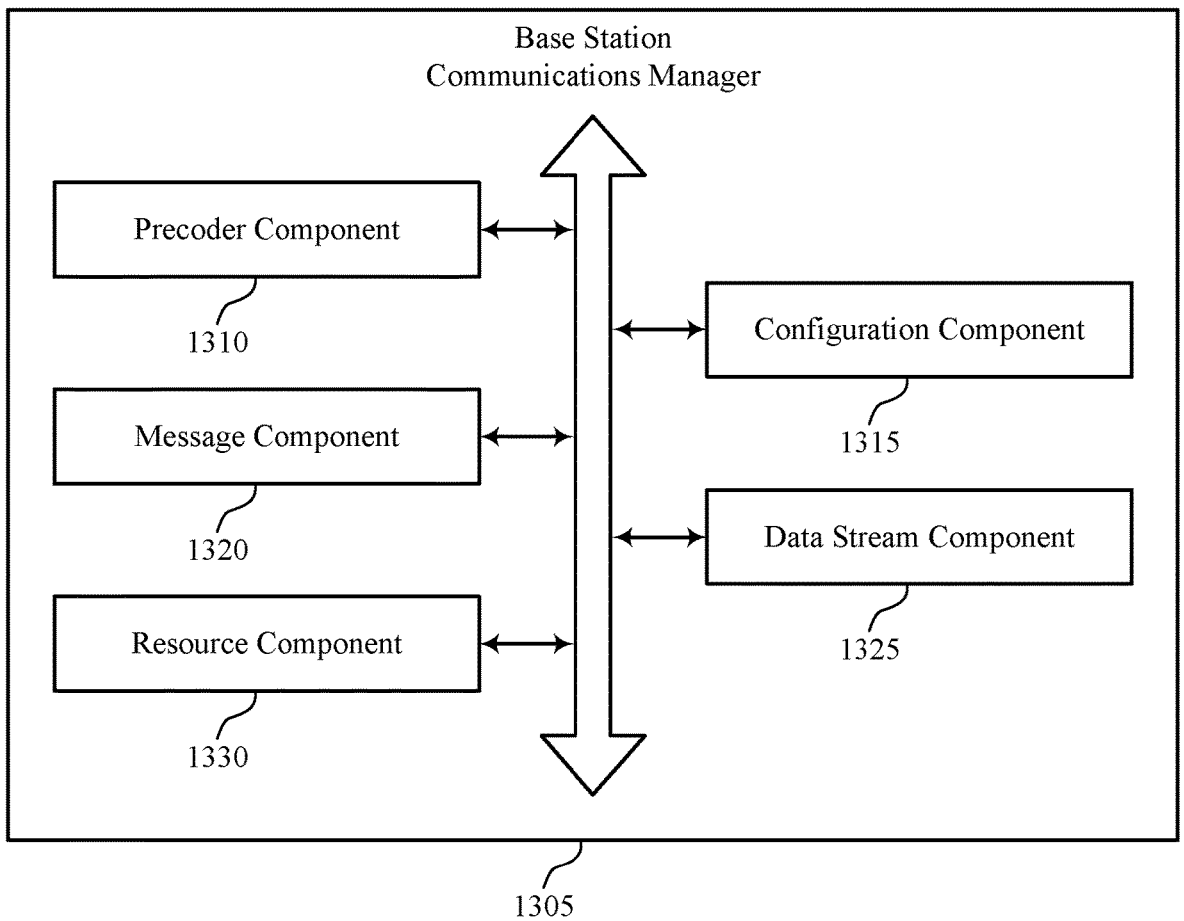
FIG. 13 shows a block diagram of a base station communications manager that supports techniques for precoding in full duplex wireless communications systems in accordance with one or more aspects of the present disclosure.

FIG. 13 shows a block diagram 1300 of a base station communications manager 1305 that supports techniques for precoding in full duplex wireless communications systems in accordance with one or more aspects of the present disclosure. The base station communications manager 1305 may be an example of aspects of a base station communications manager 1115, a base station communications manager 1215, or a base station communications manager 1410 described herein. The base station communications manager 1305 may include a precoder component 1310, a configuration component 1315, a message component 1320, a data stream component 1325, and a resource component 1330. Each of these components may communicate, directly or indirectly, with one another (e.g., via one or more buses).

The precoder component 1310 may determine a configuration including an indication for a UE to use a first precoding matrix associated with wireless communication while operating in a half duplex mode during a first portion of a TTI and a second precoding matrix for the wireless communication while operating in a full duplex mode during a second portion of the TTI, where the second precoding matrix is different than the first precoding matrix. The configuration component 1315 may transmit, to the UE, the configuration. The wireless communication includes downlink wireless communications or uplink communications, or both. In some cases, the TTI includes a mini-slot or a slot. In some cases, the first portion of the TTI and the second portion of the TTI include separate reference signals. In some cases, a first reference signal associated with the first portion of the TTI is precoded based on the first precoding matrix. In some cases, a second reference signal associated with the second portion of the TTI is precoded based on the second precoding matrix.

In some cases the precoder component 1310 may transmit, to a UE, signaling that indicates a configuration for the wireless communication, the configuration including an indication for the UE to use a first precoding matrix associated with the wireless communication when in a half duplex mode during a first portion of a TTI and a second precoding matrix for the wireless communication when in a full duplex mode during a second portion of the TTI, where the second precoding matrix is different than the first precoding matrix. The configuration component 1315 may communicate with the UE according to the configuration for the wireless communications. The wireless communication includes downlink wireless communications or uplink communications, or both. In some cases, the TTI includes a mini-slot or a slot. In some cases, the first portion of the TTI and the second portion of the TTI include separate reference signals. In some cases, a first reference signal associated with the first portion of the TTI is precoded based on the first precoding matrix. In some cases, a second reference signal associated with the second portion of the TTI is precoded based on the second precoding matrix.

A first reference signal associated with the first portion of the TTI or the second portion of the TTI, or both, includes a DMRS, a PTRS, an SRS, or a CSI-RS, or a combination thereof. In some cases, the first portion of the TTI and the second portion of the TTI correspond to separate reference signal configurations including a reference signal density in a time domain or a frequency domain, or both. In some cases, a first reference signal configuration associated with the first portion of the TTI is different than a first reference signal configuration associated with the second portion of the TTI. In some cases, the first portion of the TTI exceeds an overlap portion with the second portion of the TTI in the time domain.

The message component 1320 may transmit an RRC message including the configuration. In some examples, the message component 1320 may transmit a MAC-CE message including the configuration. In some examples, the message component 1320 may transmit a DCI message including the configuration. The message component 1320 may receive, from the UE, a message including an indication of a PMI or an RI, or both via a physical uplink channel, where the physical uplink channel includes a PUCCH or a PUSCH.

The data stream component 1325 may receive a number of data streams during the first portion of the TTI based on a first RI. In some examples, the data stream component 1325 may receive a number of data streams during the second portion of the TTI based on a second RI, where the number of data stream associated with the second portion of the TTI is different from a number of data streams associated with the first portion of the TTI.

The resource component 1330 may transmit a second configuration including an indication of a set of resources associated with using the second precoding matrix for the wireless communication during the second portion of the TTI, where the set of resources includes a set of OFDM symbols. In some cases, the set of OFDM symbols includes at least one OFDM symbol before the second portion of the TTI or at least one OFDM symbol after the second portion of the TTI, or both.

Figure 14:
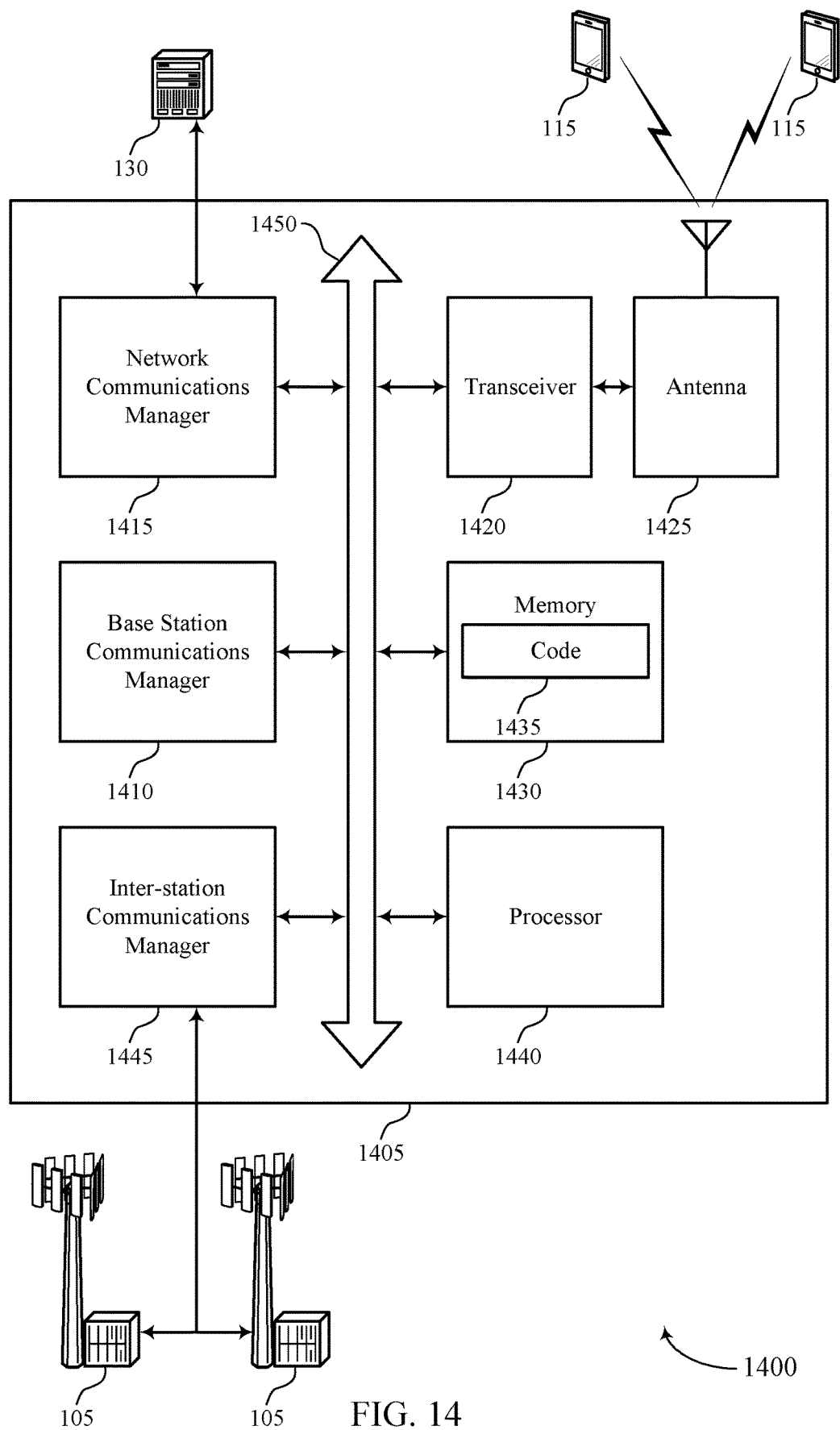
FIG. 14 shows a diagram of a system including a device that supports techniques for precoding in full duplex wireless communications systems in accordance with one or more aspects of the present disclosure.

FIG. 14 shows a diagram of a system 1400 including a device 1405 that supports techniques for precoding in full duplex wireless communications systems in accordance with one or more aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may determine a configuration including an indication for a UE to use a first precoding matrix associated with the wireless communication while operating in a half duplex mode during a first portion of a TTI and a second precoding matrix for the wireless communication while operating in a full duplex mode during a second portion of the TTI, where the second precoding matrix is different than the first precoding matrix and transmit, to the UE, the configuration.

In some cases the base station communications manager 1410 may transmit, to a UE, signaling that indicates a configuration for the wireless communication, the configuration including an indication for the UE to use a first precoding matrix associated with the wireless communication when in a half duplex mode during a first portion of a TTI and a second precoding matrix for the wireless communication when in a full duplex mode during a second portion of the TTI, where the second precoding matrix is different than the first precoding matrix and communicate with the UE according to the configuration for the wireless communications.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices. The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for precoding in full duplex wireless communications systems).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
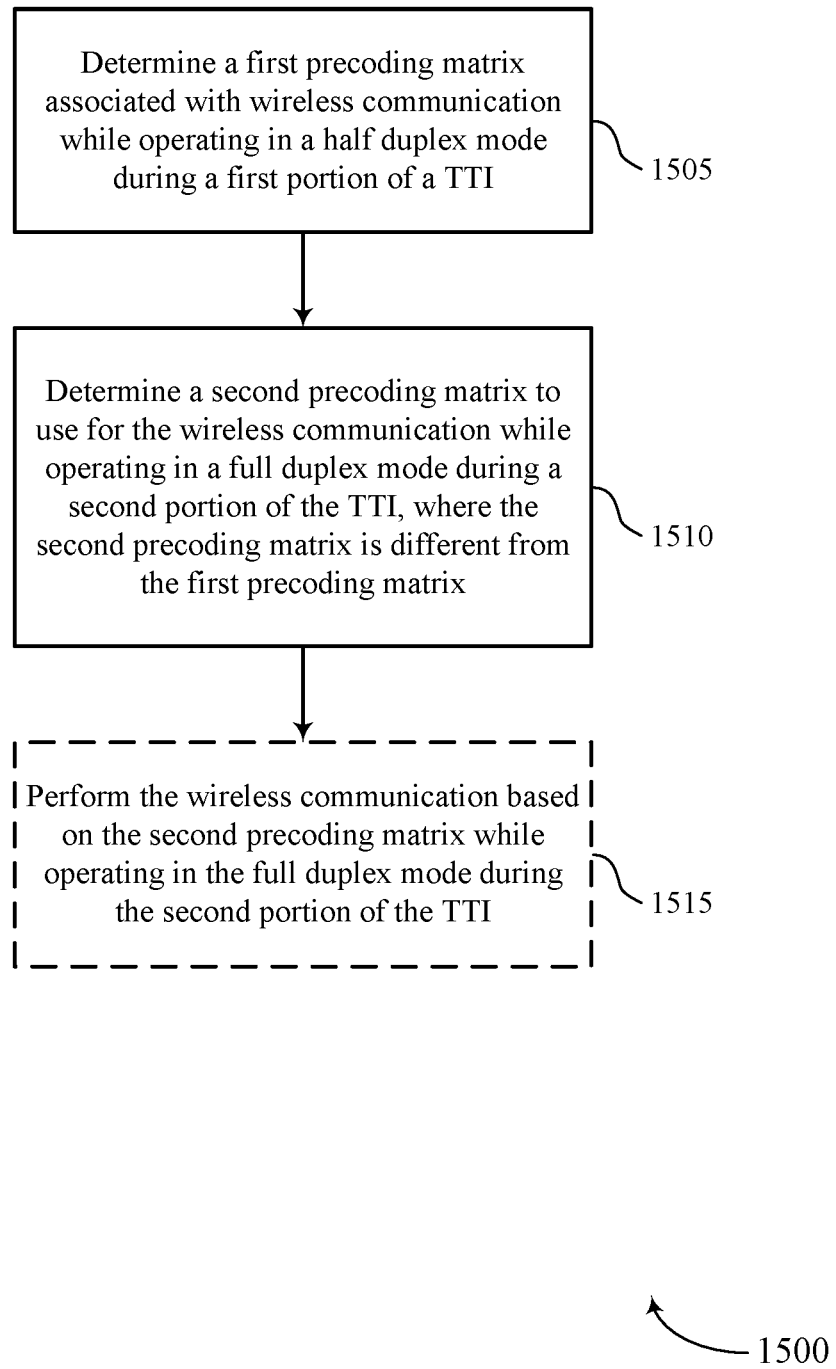
FIGS. 15 through 21 show flowcharts illustrating methods that support techniques for precoding in full duplex wireless communications systems in accordance with one or more aspects of the present disclosure.

FIG. 15 shows a flowchart illustrating a method 1500 that supports techniques for precoding in full duplex wireless communications systems in accordance with one or more aspects of the present disclosure. The operations of method 1500 may be implemented by a UE or its components as described herein. For example, the operations of method 1500 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may determine a first precoding matrix associated with wireless communication while operating in a half duplex mode during a first portion of a TTI. The operations of 1505 may be performed according to the methods described herein. In some examples, aspects of the operations of 1505 may be performed by a precoder component as described with reference to FIGS. 7 through 10.

At 1510, the UE may determine a second precoding matrix to use for the wireless communication while operating in a full duplex mode during a second portion of the TTI, where the second precoding matrix is different from the first precoding matrix. The operations of 1510 may be performed according to the methods described herein. In some examples, aspects of the operations of 1510 may be performed by a precoder component as described with reference to FIGS. 7 through 10.

At 1515, the UE may perform the wireless communication based on the second precoding matrix while operating in the full duplex mode during the second portion of the TTI. The operations of 1515 may be performed according to the methods described herein. In some examples, aspects of the operations of 1515 may be performed by a duplex mode as described with reference to FIGS. 7 through 10.

Figure 16:
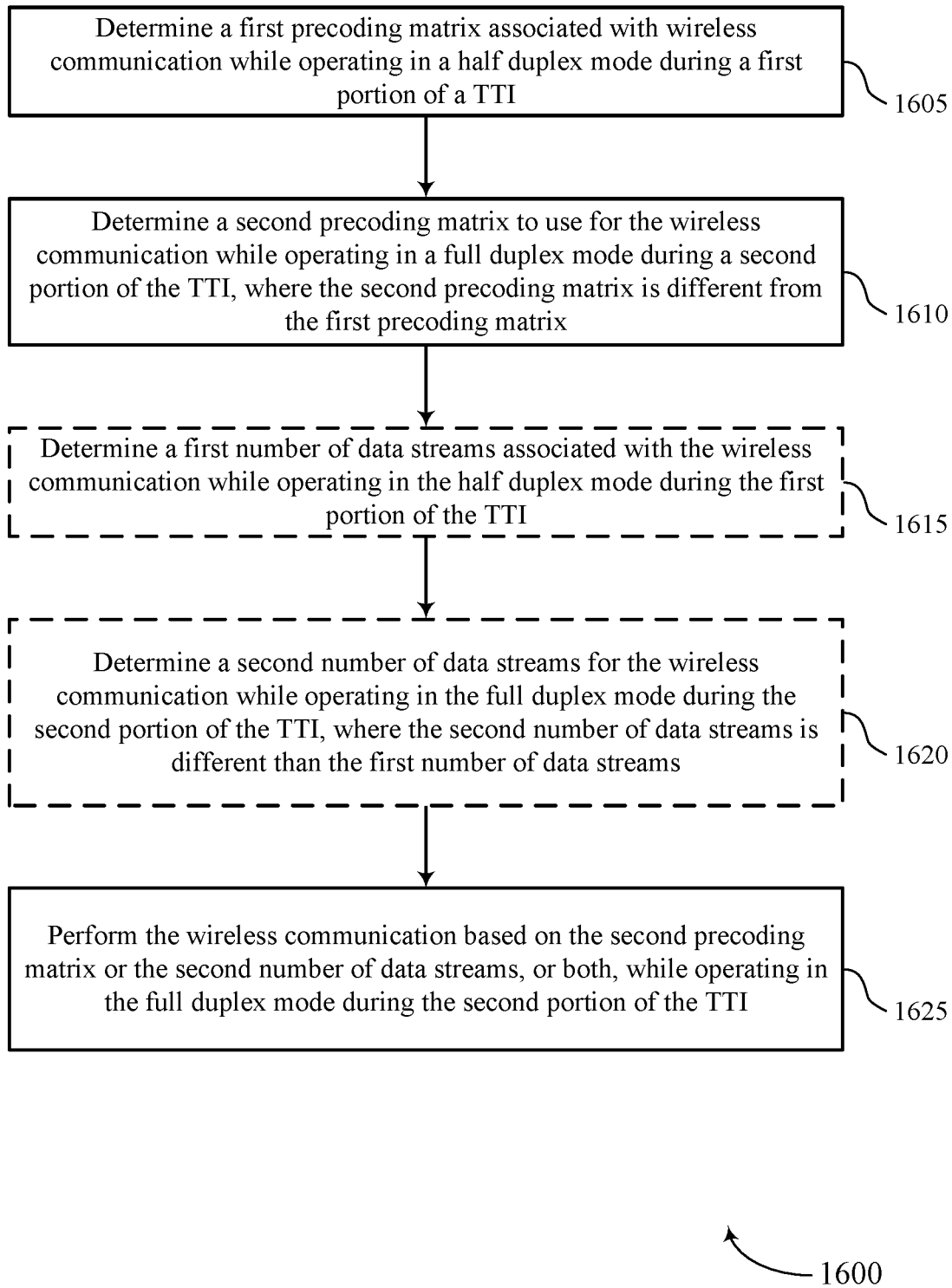

FIG. 16 shows a flowchart illustrating a method 1600 that supports techniques for precoding in full duplex wireless communications systems in accordance with one or more aspects of the present disclosure. The operations of method 1600 may be implemented by a UE or its components as described herein. For example, the operations of method 1600 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may determine a first precoding matrix associated with wireless communication while operating in a half duplex mode during a first portion of a TTI. The operations of 1605 may be performed according to the methods described herein. In some examples, aspects of the operations of 1605 may be performed by a precoder component as described with reference to FIGS. 7 through 10.

At 1610, the UE may determine a second precoding matrix to use for the wireless communication while operating in a full duplex mode during a second portion of the TTI, where the second precoding matrix is different from the first precoding matrix. The operations of 1610 may be performed according to the methods described herein. In some examples, aspects of the operations of 1610 may be performed by a precoder component as described with reference to FIGS. 7 through 10.

At 1615, the UE may determine a first number of data streams associated with the wireless communication while operating in the half duplex mode during the first portion of the TTI. The operations of 1615 may be performed according to the methods described herein. In some examples, aspects of the operations of 1615 may be performed by a data stream component as described with reference to FIGS. 7 through 10.

At 1620, the UE may determine a second number of data streams to use for the wireless communication while operating in the full duplex mode during the second portion of the TTI, where the second number of data streams is different than the first number of data streams. The operations of 1620 may be performed according to the methods described herein. In some examples, aspects of the operations of 1620 may be performed by a data stream component as described with reference to FIGS. 7 through 10.

At 1625, the UE may perform the wireless communication based on the second precoding matrix or the second number of data streams, or both, while operating in the full duplex mode during the second portion of the TTI. The operations of 1625 may be performed according to the methods described herein. In some examples, aspects of the operations of 1625 may be performed by a data stream component as described with reference to FIGS. 7 through 10.

Figure 17:
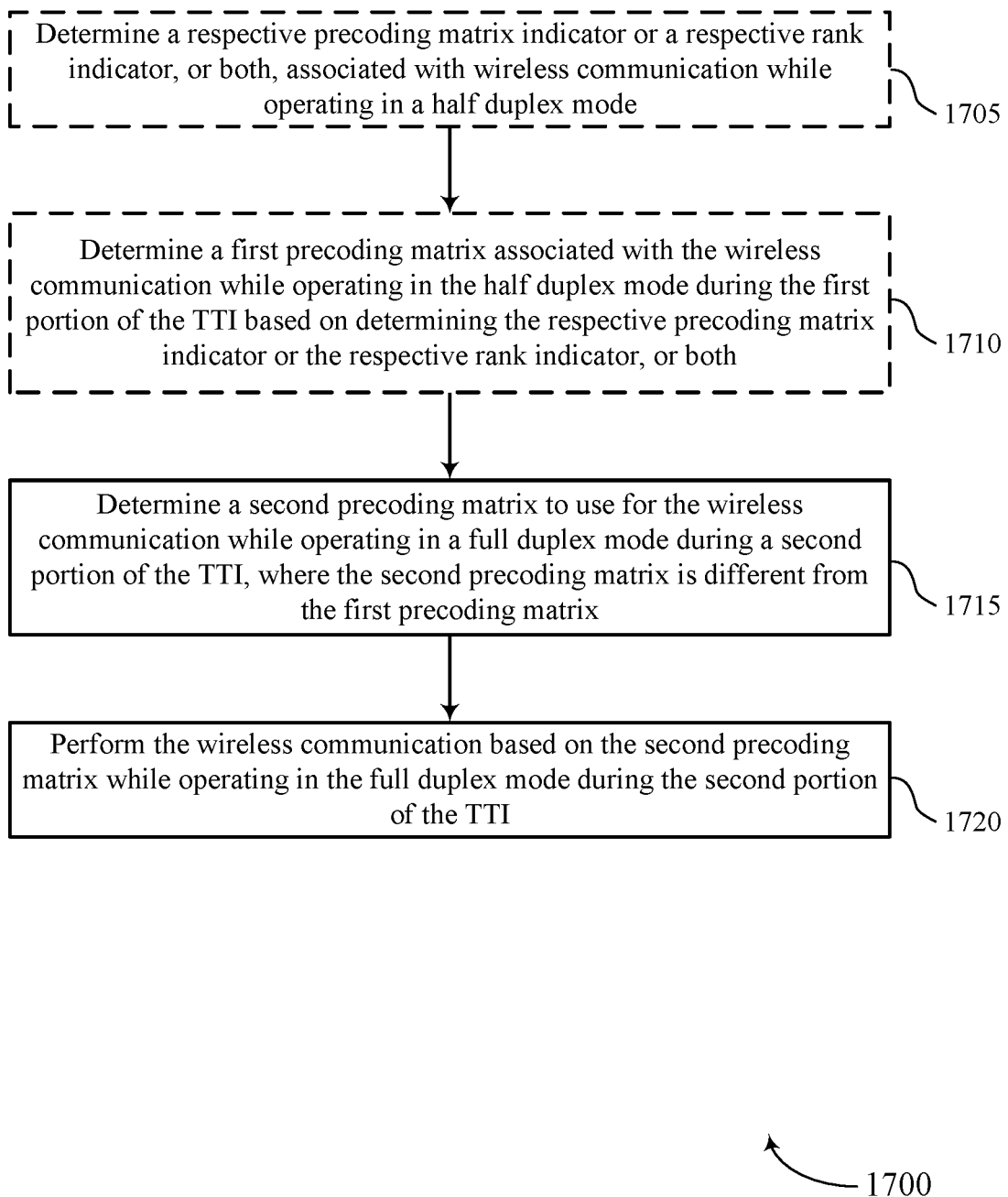

FIG. 17 shows a flowchart illustrating a method 1700 that supports techniques for precoding in full duplex wireless communications systems in accordance with one or more aspects of the present disclosure. The operations of method 1700 may be implemented by a UE or its components as described herein. For example, the operations of method 1700 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may determine a first PMI or a first RI, or both, associated with wireless communication while operating in a half duplex mode. The operations of 1705 may be performed according to the methods described herein. In some examples, aspects of the operations of 1705 may be performed by a precoder component as described with reference to FIGS. 7 through 10.

At 1710, the UE may determine a first precoding matrix associated with the wireless communication while operating in the half duplex mode during the first portion of the TTI based on determining the first PMI or the first RI, or both. The operations of 1710 may be performed according to the methods described herein. In some examples, aspects of the operations of 1710 may be performed by a precoder component as described with reference to FIGS. 7 through 10.

At 1715, the UE may determine a second precoding matrix to use for the wireless communication while operating in a full duplex mode during a second portion of the TTI, where the second precoding matrix is different from the first precoding matrix. The operations of 1715 may be performed according to the methods described herein. In some examples, aspects of the operations of 1715 may be performed by a precoder component as described with reference to FIGS. 7 through 10.

At 1720, the UE may perform the wireless communication based on the second precoding matrix while operating in the full duplex mode during the second portion of the TTI. The operations of 1720 may be performed according to the methods described herein. In some examples, aspects of the operations of 1720 may be performed by a duplex mode as described with reference to FIGS. 7 through 10.

Figure 18:
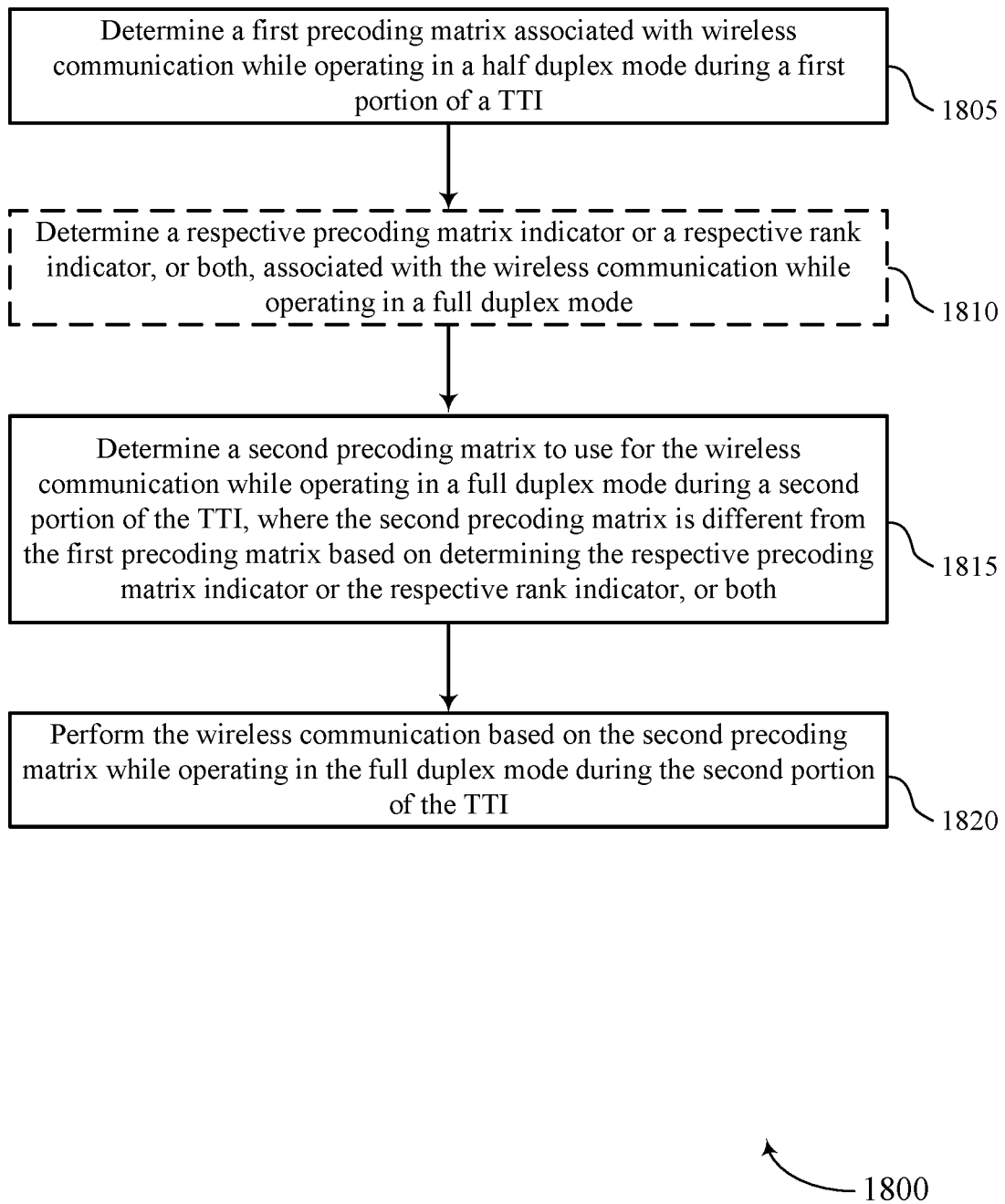

FIG. 18 shows a flowchart illustrating a method 1800 that supports techniques for precoding in full duplex wireless communications systems in accordance with one or more aspects of the present disclosure. The operations of method 1800 may be implemented by a UE or its components as described herein. For example, the operations of method 1800 may be performed by a UE communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1805, the UE may determine a first precoding matrix associated with wireless communication while operating in a half duplex mode during a first portion of a TTI. The operations of 1805 may be performed according to the methods described herein. In some examples, aspects of the operations of 1805 may be performed by a precoder component as described with reference to FIGS. 7 through 10.

At 1810, the UE may determine a second PMI or a second RI, or both, associated with the wireless communication while operating in the full duplex mode. The operations of 1810 may be performed according to the methods described herein. In some examples, aspects of the operations of 1810 may be performed by a precoder component as described with reference to FIGS. 7 through 10.

At 1815, the UE may determine a second precoding matrix to use for the wireless communication while operating in the full duplex mode during a second portion of the TTI, where the second precoding matrix is different from the first precoding matrix based on determining the second PMI or the second RI, or both. The operations of 1815 may be performed according to the methods described herein. In some examples, aspects of the operations of 1815 may be performed by a precoder component as described with reference to FIGS. 7 through 10.

At 1820, the UE may perform the wireless communication based on the second precoding matrix while operating in the full duplex mode during the second portion of the TTI. The operations of 1820 may be performed according to the methods described herein. In some examples, aspects of the operations of 1820 may be performed by a duplex mode as described with reference to FIGS. 7 through 10.

Figure 19:
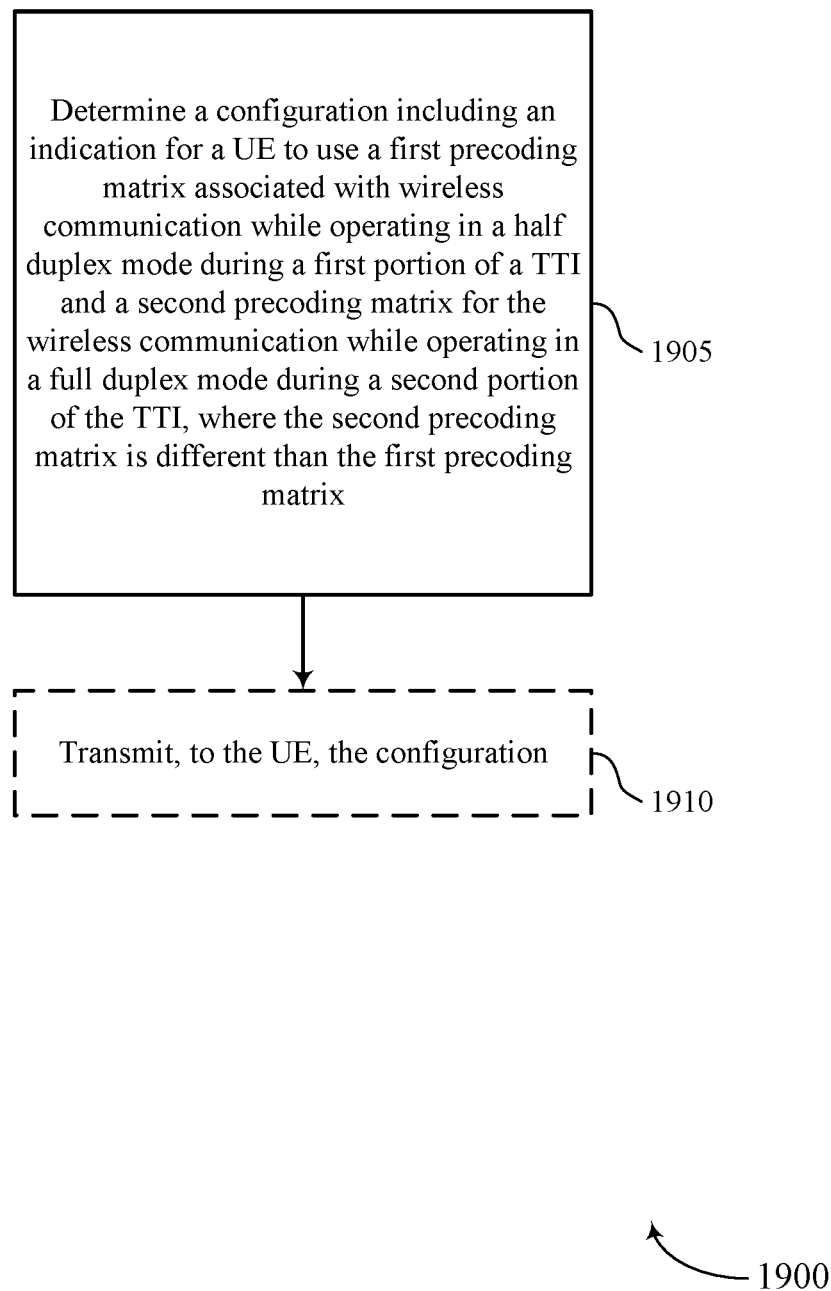

FIG. 19 shows a flowchart illustrating a method 1900 that supports techniques for precoding in full duplex wireless communications systems in accordance with one or more aspects of the present disclosure. The operations of method 1900 may be implemented by a base station or its components as described herein. For example, the operations of method 1900 may be performed by a base station communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1905, the base station may determine a configuration including an indication for a UE to use a first precoding matrix associated with wireless when in a half duplex mode during a first portion of a TTI and a second precoding matrix for the wireless communication when in a full duplex mode during a second portion of the TTI, where the second precoding matrix is different than the first precoding matrix. The operations of 1905 may be performed according to the methods described herein. In some examples, aspects of the operations of 1905 may be performed by a precoder component as described with reference to FIGS. 11 through 14.

At 1910, the base station may transmit, to the UE, the configuration. The operations of 1910 may be performed according to the methods described herein. In some examples, aspects of the operations of 1910 may be performed by a configuration component as described with reference to FIGS. 11 through 14.

Figure 20:
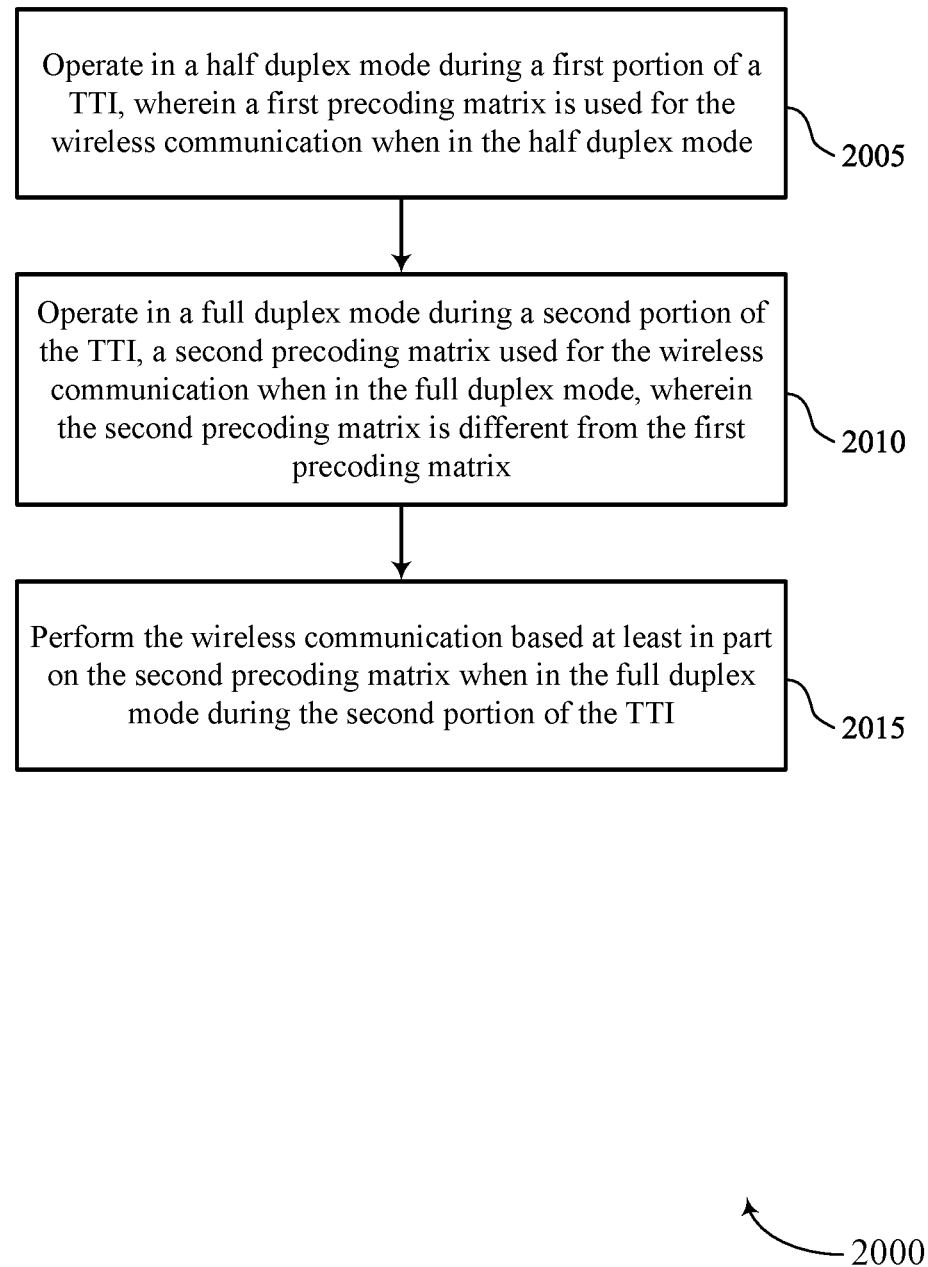

FIG. 20 shows a flowchart illustrating a method 2000 that supports techniques for precoding in full duplex wireless communications systems in accordance with one or more aspects of the present disclosure. The operations of the method 2000 may be implemented by a UE or its components as described herein. For example, the operations of the method 2000 may be performed by a UE 115 as described with reference to FIGS. 1 through 6. In some examples, a UE may execute a set of instructions to control the functional elements of the UE to perform the described functions. Additionally, or alternatively, the UE may perform aspects of the described functions using special-purpose hardware.

At 2005, the method may include operating in a half duplex mode during a first portion of a TTI, where a first precoding matrix is used for the wireless communication when in the half duplex mode. The operations of 2005 may be performed in accordance with examples as disclosed herein. In some examples, aspects of the operations of 2005 may be performed by a precoder component as described with reference to FIGS. 7 through 10.

At 2010, the method may include operating in a full duplex mode during a second portion of the TTI, a second precoding matrix used for the wireless communication when in the full duplex mode, where the second precoding matrix is different from the first precoding matrix. The operations of 2010 may be performed in accordance with examples as disclosed herein. In some examples, aspects of the operations of 2010 may be performed by a precoder component as described with reference to FIGS. 7 through 10.

At 2015, the method may include performing the wireless communication based on the second precoding matrix when in the full duplex mode during the second portion of the TTI. The operations of 2015 may be performed in accordance with examples as disclosed herein. In some examples, aspects of the operations of 2015 may be performed by a duplex mode as described with reference to FIGS. 7 through 10.

Figure 21:
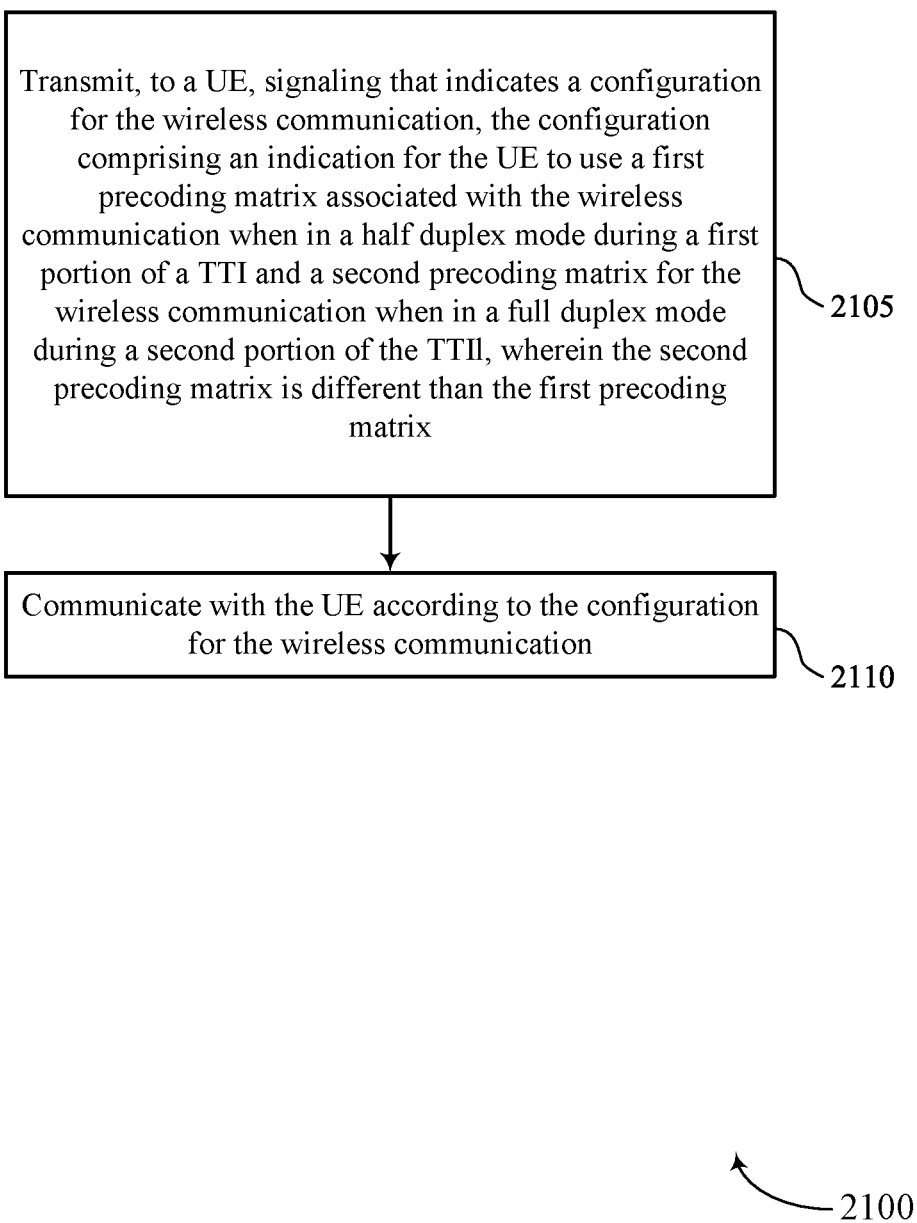

FIG. 21 shows a flowchart illustrating a method 2100 that supports techniques for precoding in full duplex wireless communications systems in accordance with one or more aspects of the present disclosure. The operations of the method 2100 may be implemented by a base station or its components as described herein. For example, the operations of the method 2100 may be performed by a base station 105 as described with reference to FIGS. 1, 2, and 7 through 10. In some examples, a base station may execute a set of instructions to control the functional elements of the base station to perform the described functions. Additionally, or alternatively, the base station may perform aspects of the described functions using special-purpose hardware.

At 2105, the method may include transmitting, to a UE, signaling that indicates a configuration for the wireless communication, the configuration including an indication for the UE to use a first precoding matrix associated with the wireless communication when in a half duplex mode during a first portion of a TTI and a second precoding matrix for the wireless communication when in a full duplex mode during a second portion of the TTI, where the second precoding matrix is different than the first precoding matrix. The operations of 2105 may be performed in accordance with examples as disclosed herein. In some examples, aspects of the operations of 2105 may be performed by a precoder component as described with reference to FIGS. 11 through 14.

At 2110, the method may include communicating with the UE according to the configuration for the wireless communication. The operations of 2110 may be performed in accordance with examples as disclosed herein. In some examples, aspects of the operations of 2110 may be performed by a configuration component as described with reference to FIGS. 11 through 14.

It should be noted that the methods described herein describe possible implementations, and that the operations may be rearranged or otherwise modified and that other implementations are possible. Further, aspects from two or more of the methods may be combined.

Aspects of the following examples may be combined with any of the previous examples or aspects described herein.

The following provides an overview of aspects of the present disclosure:

Aspect 1: A method for wireless communication at a UE, comprising: operating in a half duplex mode during a first portion of a TTI, wherein a first precoding matrix is used for the wireless communication when in the half duplex mode; operating in a full duplex mode during a second portion of the TTI, a second precoding matrix used for the wireless communication when in the full duplex mode, wherein the second precoding matrix is different from the first precoding matrix; and performing the wireless communication based at least in part on the second precoding matrix when in the full duplex mode during the second portion of the TTI.

Aspect 2: The method of aspect 1, further comprising: receiving an indication to use the first precoding matrix used for the wireless communication while operating in the half duplex mode during the first portion of the TTI, or the second precoding matrix for the wireless communication while operating in the full duplex mode during the second portion of the TTI, or both.

Aspect 3: The method of aspect 2, further comprising: receiving a DCI message comprising the indication to use the first precoding matrix used for the wireless communication while operating in the half duplex mode during the first portion of the TTI, or the second precoding matrix for the wireless communication while operating in the full duplex mode during the second portion of the TTI, or both.

Aspect 4: The method of any of aspects 1 through 3, further comprising: determining a first number of data streams associated with the wireless communication while operating in the half duplex mode during the first portion of the TTI; and determining a second number of data streams to use for the wireless communication while operating in the full duplex mode during the second portion of the TTI, wherein the second number of data streams is different than the first number of data streams, wherein performing the wireless communication comprises: performing the wireless communication based at least in part on the second precoding matrix or the second number of data streams, or both, while operating in the full duplex mode during the second portion of the TTI.

Aspect 5: The method of any of aspects 1 through 4, wherein the first portion of the TTI and the second portion of the TTI comprise separate reference signals.

Aspect 6: The method of aspect 5, wherein a first reference signal associated with the first portion of the TTI is precoded based at least in part on the first precoding matrix.

Aspect 7: The method of aspect 5, wherein a second reference signal associated with the second portion of the TTI is precoded based at least in part on the second precoding matrix.

Aspect 8: The method of aspect 5, wherein the first portion of the TTI and the second portion of the TTI correspond to separate reference signal configurations comprising a reference signal density in a time domain or a frequency domain, or both, a first reference signal configuration associated with the first portion of the TTI is different than a second reference signal configuration associated with the second portion of the TTI, and the reference signal configurations are received in a RRC message, a MAC-CE message, or a DCI message, or a combination thereof.

Aspect 9: The method of any of aspects 1 through 8, further comprising: transmitting or receiving multiple data streams while operating in the half duplex mode during the first portion of the TTI based at least in part on a first rank indicator; and transmitting or receiving a single data stream while operating in the full duplex mode during the second portion of the TTI based at least in part on a second rank indicator.

Aspect 10: The method of any of aspects 1 through 9, further comprising: transmitting a first precoding matrix indicator or a first rank indicator, or both, used for the wireless communication while operating in the half duplex mode, wherein to determine the first precoding matrix used for the wireless communication while operating in the half duplex mode during the first portion of the TTI is based at least in part on the first precoding matrix indicator or the first rank indicator, or both.

Aspect 11: The method of any aspects 1 through 10 transmitting a second precoding matrix indicator or a second rank indicator, or both, used for the wireless communication while operating in the full duplex mode during the second portion of the TTI is based at least in part on the second precoding matrix indicator or the second rank indicator, or both.

Aspect 12: The method of any of aspects 1 through 11, further comprising: determining a set of resources associated with using the second precoding matrix for the wireless communication while operating in the full duplex mode during the second portion of the TTI based at least in part on a configuration from a base station or a preconfigured rule, or both, wherein the configuration is received in a RRC message, a MAC-CE message, or a DCI message, or a combination thereof.

Aspect 13: A method for wireless communication at a base station, comprising: transmitting, to a UE, signaling that indicates a configuration for the wireless communication, the configuration comprising an indication for the UE to use a first precoding matrix used for the wireless communication when in a half duplex mode during a first portion of a TTI and a second precoding matrix for the wireless communication when in a full duplex mode during a second portion of the TTI, wherein the second precoding matrix is different than the first precoding matrix; and communicating with the UE according to the configuration for the wireless communication.

Aspect 14: The method of aspect 13, further comprising: transmitting the configuration over a DCI message, an RRC message, or a MAC-CE message, or a combination thereof.

Aspect 15: The method of any of aspects 13 through 14, further comprising: communicating a number of data streams during the first portion of the TTI based at least in part on a first rank indicator, wherein communicating comprises transmitting or receiving; and communicating another number of data streams during the second portion of the TTI based at least in part on a second rank indicator, wherein the another number of data streams associated with the second portion of the TTI is different from the number of data streams associated with the first portion of the TTI, wherein communicating comprises transmitting or receiving.

Aspect 16: The method of any of aspects 13 through 15, wherein the first portion of the TTI and the second portion of the TTI comprise separate reference signals, wherein a first reference signal associated with the first portion of the TTI is precoded based at least in part on the first precoding matrix, wherein a second reference signal associated with the second portion of the TTI is precoded based at least in part on the second precoding matrix.

Aspect 17: The method of aspect 16, wherein the first portion of the TTI and the second portion of the TTI correspond to separate reference signal configurations comprising a reference signal density in a time domain or a frequency domain, or both, a first reference signal configuration associated with the first portion of the TTI is different than a first reference signal configuration associated with the second portion of the TTI.

Aspect 18: An apparatus for wireless communication at a UE, comprising a processor and memory coupled to the processor, the processor and memory configured to perform a method of any of aspects 1 through 12.

Aspect 19: An apparatus for wireless communication at a UE, comprising at least one means for performing a method of any of aspects 1 through 12.

Aspect 20: A non-transitory computer-readable medium storing code for wireless communication at a UE, the code comprising instructions executable by a processor to perform a method of any of aspects 1 through 12.

Aspect 21: An apparatus for wireless communication at a base station, comprising a processor and memory coupled to the processor, the processor and memory configured to perform a method of any one of aspects 13 through 17.

Aspect 22: An apparatus for wireless communication at a base station, comprising at least one means for performing a method of any of aspects 13 through 17.

Aspect 23: A non-transitory computer-readable medium storing code for wireless communication at a base station, the code comprising instructions executable by a processor to perform a method of any of aspects 13 through 17.

Aspect 24: A method for wireless communication at a UE, comprising: determining a first precoding matrix associated with the wireless communication while operating in a half duplex mode during a first portion of a TTI; determining a second precoding matrix to use for the wireless communication while operating in a full duplex mode during a second portion of the TTI, wherein the second precoding matrix is different from the first precoding matrix; and performing the wireless communication based at least in part on the second precoding matrix while operating in the full duplex mode during the second portion of the TTI.

Aspect 25: The method of aspect 24, further comprising: receiving an indication to use the first precoding matrix associated with the wireless communication while operating in the half duplex mode during the first portion of a TTI, or the second precoding matrix for the wireless communication while operating in the full duplex mode during the second portion of the TTI, or both.

Aspect 26: The method of aspect 25, further comprising: receiving a RRC message comprising the indication to use the first precoding matrix associated with the wireless communication while operating in the half duplex mode during the first portion of a TTI, or the second precoding matrix for the wireless communication while operating in the full duplex mode during the second portion of the TTI, or both.

Aspect 27: The method of aspect 25, further comprising: receiving a MAC-CE message comprising the indication to use the first precoding matrix associated with the wireless communication while operating in the half duplex mode during the first portion of a TTI, or the second precoding matrix for the wireless communication while operating in the full duplex mode during the second portion of the TTI, or both.

Aspect 28: The method of aspect 25, further comprising: receiving a DCI message comprising the indication to use the first precoding matrix associated with the wireless communication while operating in the half duplex mode during the first portion of a TTI, or the second precoding matrix for the wireless communication while operating in the full duplex mode during the second portion of the TTI, or both.

Aspect 29: The method of any of aspects 24 through 28, further comprising: determining a first number of data streams associated with the wireless communication while operating in the half duplex mode during the first portion of the TTI; and determining a second number of data streams to use for the wireless communication while operating in the full duplex mode during the second portion of the TTI, wherein the second number of data streams is different than the first number of data streams, wherein performing the wireless communication comprises performing the wireless communication based at least in part on the second precoding matrix or the second number of data streams, or both, while operating in the full duplex mode during the second portion of the TTI.

Aspect 30: The method of any of aspects 24 through 29, further comprising: transmitting or receiving multiple data streams while operating in the half duplex mode during the first portion of the TTI based at least in part on the first number of data streams.

Aspect 31: The method of any of aspects 24 through 30, further comprising: transmitting or receiving a single data stream while operating in the full duplex mode during the second portion of the TTI based at least in part on the second number of data streams.

Aspect 32: The method of any of aspects 24 through 31, further comprising: determining a respective precoding matrix indicator or a respective rank indicator, or both, associated with the wireless communication while operating in the half duplex mode, wherein determining the first precoding matrix associated with the wireless communication while operating in the half duplex mode during the first portion of the TTI is based at least in part on determining the respective precoding matrix indicator or the respective rank indicator, or both.

Aspect 33: The method of aspect 32, further comprising: transmitting a message comprising an indication of the respective precoding matrix indicator or the respective rank indicator, or both via a physical uplink channel, wherein the physical uplink channel comprises a physical uplink control channel or a physical uplink shared channel.

Aspect 34: The method of any of aspects 24 through 33, further comprising: determining a respective precoding matrix indicator or a respective rank indicator, or both, associated with the wireless communication while operating in the full duplex mode, wherein determining the second precoding matrix associated with the wireless communication while operating in the full duplex mode during the second portion of the TTI is based at least in part on determining the respective precoding matrix indicator or the respective rank indicator, or both.

Aspect 35: The method of aspect 34, further comprising: transmitting a message comprising an indication of the respective precoding matrix indicator or the respective rank indicator, or both via a physical uplink channel, wherein the physical uplink channel comprises a physical uplink control channel or a physical uplink shared channel.

Aspect 36: The method of any of aspects 24 through 35, wherein the first portion of the TTI and the second portion of the TTI comprise separate reference signals.

Aspect 37: The method of aspect 36, wherein a respective reference signal associated with the first portion of the TTI is precoded based at least in part on the first precoding matrix.

Aspect 38: The method of aspect 36, wherein a respective reference signal associated with the second portion of the TTI is precoded based at least in part on the second precoding matrix.

Aspect 39: The method of aspect 36, wherein a respective reference signal associated with the first portion of the TTI or the second portion of the TTI, or both, comprises a demodulation reference signal, a phase tracking reference signal, a sounding reference signal, or a channel state information reference signal, or a combination thereof.

Aspect 40: The method of aspect 36, wherein the first portion of the TTI and the second portion of the TTI correspond to separate reference signal configurations comprising a reference signal density in a time domain or a frequency domain, or both, wherein the reference signal configurations are received in a RRC message, a MAC-CE message, or a DCI message, or a combination thereof.

Aspect 41: The method of aspect 40, wherein a respective reference signal configuration associated with the first portion of the TTI is different than a respective reference signal configuration associated with the second portion of the TTI.

Aspect 42: The method of any of aspects 24 through 41, further comprising: determining an overlap portion between the first portion of the TTI and the second portion of the TTI in a time domain.

Aspect 43: The method of aspect 42, further comprising: enabling a configuration during the overlap portion between the first portion of the TTI and the second portion of the TTI, the configuration comprises a separate precoder or a separate number of data streams, or both, to use during the overlap portion.

Aspect 44: The method of aspect 42, wherein the first portion of the TTI exceeds the overlap portion with the second portion of the TTI in the time domain.

Aspect 45: The method of any of aspects 24 through 44, further comprising: determining a set of resources associated with using the second precoding matrix for the wireless communication while operating in the full duplex mode during the second portion of the TTI based at least in part on a configuration from a base station or a preconfigured rule, or both, wherein the configuration is received in a RRC message, a MAC-CE message, or a DCI message, or a combination thereof.

Aspect 46: The method of aspect 45, wherein the set of resources comprises a set of OFDM symbols.

Aspect 47: The method of aspect 46, wherein the set of OFDM symbols comprises at least one OFDM symbol before the second portion of the TTI or at least one OFDM symbol after the second portion of the TTI, or both.

Aspect 48: The method of any of aspects 24 through 47, further comprising: receiving a message including a configuration comprising an indication for the UE to use the first precoding matrix associated with the wireless communication while operating in the half duplex mode during the first portion of a TTI and the second precoding matrix for the wireless communication while operating in the full duplex mode during a second portion of the TTI, wherein the message comprises a RRC message, a MAC-CE message, or a DCI message, or a combination thereof.

Aspect 49: The method of any of aspects 24 through 48, wherein the wireless communication comprises downlink wireless communications.

Aspect 50: The method of any of aspects 24 through 49, wherein the wireless communication comprises uplink wireless communications.

Aspect 51: The method of any of aspects 24 through 50, wherein the TTI comprises a mini-slot.

Aspect 52: The method of any of aspects 24 through 51, wherein the TTI comprises a slot.

Aspect 53: A method for wireless communication at a base station, comprising: determining a configuration comprising an indication for a user equipment (UE) to use a first precoding matrix associated with the wireless communication while operating in a half duplex mode during a first portion of a TTI and a second precoding matrix for the wireless communication while operating in a full duplex mode during a second portion of the TTI, wherein the second precoding matrix is different than the first precoding matrix; and transmitting, to the UE, the configuration.

Aspect 54: The method of aspect 53, further comprising: transmitting an RRC message comprising the configuration.

Aspect 55: The method of aspect 53 through 54, further comprising: transmitting a MAC-CE message comprising the configuration.

Aspect 56: The method of any of aspects 53 through 55, further comprising: transmitting a DCI message comprising the configuration.

Aspect 57: The method of any of aspects 53 through 56, further comprising: receiving a number of data streams during the first portion of the TTI based at least in part on a first rank indicator.

Aspect 58: The method of any of aspects 53 through 57, further comprising: receiving a number of data streams during the second portion of the TTI based at least in part on a second rank indicator, wherein the number of data stream associated with the second portion of the TTI is different from a number of data streams associated with the first portion of the TTI.

Aspect 59: The method of any of aspects 53 through 58, further comprising: receiving, from the UE, a message comprising an indication of a respective precoding matrix indicator or a respective rank indicator, or both via a physical uplink channel, wherein the physical uplink channel comprises a physical uplink control channel or a physical uplink shared channel.

Aspect 60: The method of any of aspects 53 through 59, wherein the first portion of the TTI and the second portion of the TTI comprise separate reference signals.

Aspect 61: The method of aspect 60, wherein a respective reference signal associated with the first portion of the TTI is precoded based at least in part on the first precoding matrix.

Aspect 62: The method of aspect 60, wherein a respective reference signal associated with the second portion of the TTI is precoded based at least in part on the second precoding matrix.

Aspect 63: The method of aspect 60, wherein a respective reference signal associated with the first portion of the TTI or the second portion of the TTI, or both, comprises a demodulation reference signal, a phase tracking reference signal, a sounding reference signal, or a channel state information reference signal, or a combination thereof.

Aspect 64: The method of aspect 60, wherein the first portion of the TTI and the second portion of the TTI correspond to separate reference signal configurations comprising a reference signal density in a time domain or a frequency domain, or both.

Aspect 65: The method of aspect 64, wherein a respective reference signal configuration associated with the first portion of the TTI is different than a respective reference signal configuration associated with the second portion of the TTI.

Aspect 66: The method of any of aspects 53 through 65, wherein the first portion of the TTI exceeds an overlap portion with the second portion of the TTI in the time domain.

Aspect 67: The method of any of aspects 53 through 66, further comprising: transmitting a second configuration comprising an indication of a set of resources associated with using the second precoding matrix for the wireless communication during the second portion of the TTI, wherein the set of resources comprises a set of OFDM symbols.

Aspect 68: The method of aspect 67, wherein the set of OFDM symbols comprises at least one OFDM symbol before the second portion of the TTI or at least one OFDM symbol after the second portion of the TTI, or both.

Aspect 69: The method of any of aspects 53 through 68, wherein the wireless communication comprises downlink wireless communications.

Aspect 70: The method of any of aspects 53 through 69, wherein the wireless communication comprises uplink wireless communications.

Aspect 71: The method of any of aspects 53 through 70, wherein the TTI comprises a mini-slot.

Aspect 72: The method of any of aspects 53 through 71, wherein the TTI comprises a slot.

Aspect 73: An apparatus for wireless communication comprising at least one means for performing a method of any one of aspects 24 through 52.

Aspect 74: An apparatus for wireless communication comprising a processor and memory coupled to the processor, the processor and memory configured to perform a method of any one of aspects 24 through 52.

Aspect 75: A non-transitory computer-readable medium storing code for wireless communication, the code comprising instructions executable by a processor to perform a method of any one of aspects 24 through 52.

Aspect 76: An apparatus for wireless communication comprising at least one means for performing a method of any one of aspects 53 through 72.

Aspect 77: An apparatus for wireless communication comprising a processor and memory coupled to the processor, the processor and memory configured to perform a method of any one of aspects 53 through 72.

Aspect 78: A non-transitory computer-readable medium storing code for wireless communication, the code comprising instructions executable by a processor to perform a method of any one of aspects 53 through 72.

Aspect 79: A method for wireless communication at a UE, comprising: operating in a half duplex mode during a first portion of a TTI, wherein a first precoding matrix is used for the wireless communication while operating in the half duplex mode; operating in a full duplex mode during a second portion of the TTI, a second precoding matrix used for the wireless communication while operating in the full duplex mode, wherein the second precoding matrix is different from the first precoding matrix; and performing the wireless communication based at least in part on the second precoding matrix while operating in the full duplex mode during the second portion of the TTI.

Aspect 80: The method of aspect 79, further comprising: receiving an indication to use the first precoding matrix used for the wireless communication while operating in the half duplex mode during the first portion of the TTI, or the second precoding matrix for the wireless communication while operating in the full duplex mode during the second portion of the TTI, or both.

Aspect 81: The method of aspect 80, further comprising: receiving a DCI message comprising the indication to use the first precoding matrix used for the wireless communication while operating in the half duplex mode during the first portion of the TTI, or the second precoding matrix for the wireless communication while operating in the full duplex mode during the second portion of the TTI, or both.

Aspect 82: The method of any of aspects 79 through 81, further comprising: determining a first number of data streams associated with the wireless communication while operating in the half duplex mode during the first portion of the TTI; and determining a second number of data streams to use for the wireless communication while operating in the full duplex mode during the second portion of the TTI, wherein the second number of data streams is different than the first number of data streams, wherein performing the wireless communication comprises: performing the wireless communication based at least in part on the second precoding matrix or the second number of data streams, or both, while operating in the full duplex mode during the second portion of the TTI.

Aspect 83: The method of any of aspects 79 through 82, wherein the first portion of the TTI and the second portion of the TTI comprise separate reference signals.

Aspect 84: The method of aspect 83, wherein a first reference signal associated with the first portion of the TTI is precoded based at least in part on the first precoding matrix.

Aspect 85: The method of aspect 83, wherein a second reference signal associated with the second portion of the TTI is precoded based at least in part on the second precoding matrix.

Aspect 86: The method of aspect 83, wherein the first portion of the TTI and the second portion of the TTI correspond to separate reference signal configurations comprising a reference signal density in a time domain or a frequency domain, or both, a first reference signal configuration associated with the first portion of the TTI is different than a second reference signal configuration associated with the second portion of the TTI, and the reference signal configurations are received in a RRC message, a MAC-CE message, or a DCI message, or a combination thereof.

Aspect 87: The method of any of aspects 79 through 86, further comprising: transmitting or receiving multiple data streams while operating in the half duplex mode during the first portion of the TTI based at least in part on a first rank indicator; and transmitting or receiving a single data stream while operating in the full duplex mode during the second portion of the TTI based at least in part on a second rank indicator.

Aspect 88: The method of any of aspects 79 through 87, further comprising: transmitting a first precoding matrix indicator or a first rank indicator, or both, used for the wireless communication while operating in the half duplex mode, wherein to determine the first precoding matrix used for the wireless communication while operating in the half duplex mode during the first portion of the TTI is based at least in part on the first precoding matrix indicator or the first rank indicator, or both.

Aspect 89: The method of any aspects 79 through 88 transmitting a second precoding matrix indicator or a second rank indicator, or both, used for the wireless communication while operating in the full duplex mode during the second portion of the TTI is based at least in part on the second precoding matrix indicator or the second rank indicator, or both.

Aspect 90: The method of any of aspects 79 through 89, further comprising: determining a set of resources associated with using the second precoding matrix for the wireless communication while operating in the full duplex mode during the second portion of the TTI based at least in part on a configuration from a base station or a preconfigured rule, or both, wherein the configuration is received in a RRC message, a MAC-CE message, or a DCI message, or a combination thereof.

Aspect 91: A method for wireless communication at a base station, comprising: transmitting, to a UE, signaling that indicates a configuration for the wireless communication, the configuration comprising an indication for the UE to use a first precoding matrix used for the wireless communication when in a half duplex mode during a first portion of a TTI and a second precoding matrix for the wireless communication when in a full duplex mode during a second portion of the TTI, wherein the second precoding matrix is different than the first precoding matrix; and communicating with the UE according to the configuration for the wireless communication.

Aspect 92: The method of aspect 91, further comprising: transmitting the configuration over a DCI message, an RRC message, or a MAC-CE message, or a combination thereof.

Aspect 93: The method of any of aspects 91 through 92, further comprising: communicating a number of data streams during the first portion of the TTI based at least in part on a first rank indicator, wherein communicating comprises transmitting or receiving; and communicating another number of data streams during the second portion of the TTI based at least in part on a second rank indicator, wherein the another number of data streams associated with the second portion of the TTI is different from the number of data streams associated with the first portion of the TTI, wherein communicating comprises transmitting or receiving.

Aspect 94: The method of any of aspects 91 through 93, wherein the first portion of the TTI and the second portion of the TTI comprise separate reference signals, wherein a first reference signal associated with the first portion of the TTI is precoded based at least in part on the first precoding matrix, wherein a second reference signal associated with the second portion of the TTI is precoded based at least in part on the second precoding matrix.

Aspect 95: The method of aspect 94, wherein the first portion of the TTI and the second portion of the TTI correspond to separate reference signal configurations comprising a reference signal density in a time domain or a frequency domain, or both, a first reference signal configuration associated with the first portion of the TTI is different than a first reference signal configuration associated with the second portion of the TTI.

Aspect 96: An apparatus for wireless communication at a UE, comprising a processor and memory coupled to the processor, the processor and memory configured to perform a method of any of aspects 79 through 90.

Aspect 97: An apparatus for wireless communication at a UE, comprising at least one means for performing a method of any of aspects 79 through 90.

Aspect 98: A non-transitory computer-readable medium storing code for wireless communication at a UE, the code comprising instructions executable by a processor to perform a method of any of aspects 79 through 90.

Aspect 99: An apparatus for wireless communication at a base station, comprising a processor and memory coupled to the processor, the processor and memory configured to perform a method of any one of aspects 91 through 95.

Aspect 100: An apparatus for wireless communication at a base station, comprising at least one means for performing a method of any of aspects 91 through 95.

Aspect 101: A non-transitory computer-readable medium storing code for wireless communication at a base station, the code comprising instructions executable by a processor to perform a method of any of aspects 91 through 95.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of or" one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
one or more memories; and
one or more processors coupled with the one or more memories and configured to cause the UE to:
operate in a half duplex mode using a first set of parameters corresponding to a first set of parameter values and during a first portion of a transmission time interval, wherein a first parameter value of the first set of parameter values indicates a first precoding matrix associated with a first bandwidth part, and wherein the first set of parameters are used for the wireless communication when in the half duplex mode;
operate in a full duplex mode using a second set of parameters corresponding to a second set of parameter values and during a second portion of the transmission time interval, wherein a second parameter value of the second set of parameter values indicates a second precoding matrix associated with a second bandwidth part, wherein the second set of parameters are used for the wireless communication when in the full duplex mode, wherein the second precoding matrix is different from the first precoding matrix, and wherein one or more parameter values of the first set of parameter values are different than one or more parameter values of the second set of parameter values; and
perform the wireless communication using the second set of parameters and based at least in part on the second precoding matrix and the second bandwidth part when in the full duplex mode during the second portion of the transmission time interval.

2. The apparatus of claim 1, wherein the one or more processors are configured to cause the UE to:
receive an indication to use the first precoding matrix used for the wireless communication while operating in the half duplex mode during the first portion of the transmission time interval, or the second precoding matrix for the wireless communication while operating in the full duplex mode during the second portion of the transmission time interval, or both.

3. The apparatus of claim 2, wherein the one or more processors are configured to cause the UE to:
receive a downlink control information message comprising the indication to use the first precoding matrix used for the wireless communication while operating in the half duplex mode during the first portion of the transmission time interval, or the second precoding matrix for the wireless communication while operating in the full duplex mode during the second portion of the transmission time interval, or both.

4. The apparatus of claim 1, wherein the one or more processors are configured to cause the UE to:
determine a first number of data streams associated with the wireless communication while operating in the half duplex mode during the first portion of the transmission time interval; and
determine a second number of data streams to use for the wireless communication while operating in the full duplex mode during the second portion of the transmission time interval, wherein the second number of data streams is different than the first number of data streams, wherein, to perform the wireless communication, the one or more processors are configured to cause the UE to:
perform the wireless communication based at least in part on the second precoding matrix or the second number of data streams, or both, while operating in the full duplex mode during the second portion of the transmission time interval.

5. The apparatus of claim 1, wherein the first portion of the transmission time interval and the second portion of the transmission time interval comprise separate reference signals.

6. The apparatus of claim 5, wherein a first reference signal associated with the first portion of the transmission time interval is precoded based at least in part on the first precoding matrix.

7. The apparatus of claim 5, wherein a second reference signal associated with the second portion of the transmission time interval is precoded based at least in part on the second precoding matrix.

8. The apparatus of claim 5, wherein:
the first portion of the transmission time interval and the second portion of the transmission time interval correspond to separate reference signal configurations comprising a reference signal density in a time domain or a frequency domain, or both,
a first reference signal configuration associated with the first portion of the transmission time interval is different than a second reference signal configuration associated with the second portion of the transmission time interval, and
the first reference signal configuration and the second reference signal configuration are received in a radio resource control message, a medium access control-control element message, or a downlink control information message, or a combination thereof.

9. The apparatus of claim 1, wherein the one or more processors are configured to cause the UE to:
transmit or receive multiple data streams while operating in the half duplex mode during the first portion of the transmission time interval based at least in part on a first rank indicator; and
transmit or receive a single data stream while operating in the full duplex mode during the second portion of the transmission time interval based at least in part on a second rank indicator.

10. The apparatus of claim 1, wherein the one or more processors are configured to cause the UE to:
transmit a first precoding matrix indicator or a first rank indicator, or both, used for the wireless communication while operating in the half duplex mode, wherein the first precoding matrix used for the wireless communication while operating in the half duplex mode during the first portion of the transmission time interval is based at least in part on the first precoding matrix indicator or the first rank indicator, or both.

11. The apparatus of claim 1, wherein the one or more processors are configured to cause the UE to:
transmit a second precoding matrix indicator or a second rank indicator, or
both, used for the wireless communication while operating in the full duplex mode, wherein the second precoding matrix used for the wireless communication while operating in the full duplex mode during the second portion of the transmission time interval is based at least in part on the second precoding matrix indicator or the second rank indicator, or both.

12. The apparatus of claim 1, wherein the one or more processors are configured to cause the UE to:
  determine a set of resources associated with using the second precoding matrix for the wireless communication while operating in the full duplex mode during the second portion of the transmission time interval based at least in part on a configuration from a network entity or a preconfigured rule, or both, wherein the configuration is received in a radio resource control message, a medium access control-control element message, or a downlink control information message, or a combination thereof.

13. The apparatus of claim 1, wherein the first bandwidth part and the second bandwidth part are non-overlapping or overlapping.

14. An apparatus for wireless communication at a network entity, comprising:
  one or more memories; and
  one or more processors coupled with the one or more memories configured to cause the network entity to:
    transmit signaling that indicates a configuration for the wireless communication, the configuration comprising an indication for a user equipment (UE) to use:
      a first set of parameters corresponding to a first set of parameter values when in a half duplex mode during a first portion of a transmission time interval, wherein a first parameter value of the first set of parameter values indicates a first precoding matrix associated with a first bandwidth part, and
      a second set of parameters corresponding to a second set of parameter values when in a full duplex mode during a second portion of the transmission time interval, wherein a second parameter value of the second set of parameter values indicates a second precoding matrix associated with a second bandwidth part for the wireless communication, wherein the second precoding matrix is different than the first precoding matrix, and wherein one or more parameter values of the first set of parameter values are different than one or more parameter values of the second set of parameter values; and
    communicate with the UE according to the configuration for the wireless communication.

15. The apparatus of claim 14, wherein the one or more processors are configured to cause the network entity to:
  transmit the configuration over a downlink control information message, a radio resource control message, or a medium access control-control element message, or a combination thereof.

16. The apparatus of claim 14, wherein the one or more processors are configured to cause the network entity to:
  communicate a number of data streams during the first portion of the transmission time interval based at least in part on a first rank indicator, wherein, to communicate the number of data streams, the one or more processors are configured to cause the network entity to receive or transmit the number of data streams; and
  communicate another number of data streams during the second portion of the transmission time interval based at least in part on a second rank indicator, wherein the another number of data streams associated with the second portion of the transmission time interval is different from the number of data streams associated with the first portion of the transmission time interval, wherein, to communicate the another number of data streams, the one or more processors are further configured to cause the network entity to: receive or transmit the another number of data streams.

17. The apparatus of claim 14, wherein:
  the first portion of the transmission time interval and the second portion of the transmission time interval comprise separate reference signals;
  a first reference signal associated with the first portion of the transmission time interval is precoded based at least in part on the first precoding matrix; and
  a second reference signal associated with the second portion of the transmission time interval is precoded based at least in part on the second precoding matrix.

18. The apparatus of claim 17, wherein:
  the first portion of the transmission time interval and the second portion of the transmission time interval correspond to separate reference signal configurations comprising a reference signal density in a time domain or a frequency domain, or both; and
  a first reference signal configuration associated with the first portion of the transmission time interval is different than a second reference signal configuration associated with the second portion of the transmission time interval.

19. The apparatus of claim 14, wherein the first bandwidth part and the second bandwidth part are non-overlapping or overlapping.

20. A method for wireless communication at a user equipment (UE), comprising:
  operating in a half duplex mode using a first set of parameters corresponding to a first set of parameter values and during a first portion of a transmission time interval, wherein a first parameter value of the first set of parameter values indicates a first precoding matrix associated with a first bandwidth part, and wherein the first set of parameters are used for the wireless communication when in the half duplex mode;
  operating in a full duplex mode using a second set of parameters corresponding to a second set of parameter values and during a second portion of the transmission time interval, wherein a second parameter value of the second set of parameter values indicates a second precoding matrix associated with a second bandwidth part, wherein the second set of parameters are used for the wireless communication when in the full duplex mode, wherein the second precoding matrix is different from the first precoding matrix, and wherein one or more parameter values of the first set of parameter values are different than one or more parameter values of the second set of parameter values; and
  performing the wireless communication using the second set of parameters and based at least in part on the second precoding matrix and the second bandwidth part when in the full duplex mode during the second portion of the transmission time interval.

21. The method of claim 20, further comprising:
  receiving an indication to use the first precoding matrix used for the wireless communication while operating in the half duplex mode during the first portion of the transmission time interval, or the second precoding matrix for the wireless communication while operating in the full duplex mode during the second portion of the transmission time interval, or both.

22. The method of claim 21, further comprising:
  receiving a downlink control information message comprising the indication to use the first precoding matrix used for the wireless communication while operating in the half duplex mode during the first portion of the transmission time interval, or the second precoding matrix for the wireless communication while operating in the full duplex mode during the second portion of the transmission time interval, or both.

23. The method of claim 20, further comprising:
determining a first number of data streams associated with the wireless communication while operating in the half duplex mode during the first portion of the transmission time interval; and
determining a second number of data streams to use for the wireless communication while operating in the full duplex mode during the second portion of the transmission time interval, wherein the second number of data streams is different than the first number of data streams, wherein performing the wireless communication comprises:
performing the wireless communication based at least in part on the second precoding matrix or the second number of data streams, or both, while operating in the full duplex mode during the second portion of the transmission time interval.

24. The method of claim 20, wherein:
the first portion of the transmission time interval and the second portion of the transmission time interval comprise separate reference signals;
a first reference signal associated with the first portion of the transmission time interval is precoded based at least in part on the first precoding matrix; and
a second reference signal associated with the second portion of the transmission time interval is precoded based at least in part on the second precoding matrix.

25. The method of claim 24, wherein:
the first portion of the transmission time interval and the second portion of the transmission time interval correspond to separate reference signal configurations comprising a reference signal density in a time domain or a frequency domain, or both;
a first reference signal configuration associated with the first portion of the transmission time interval is different than a second reference signal configuration associated with the second portion of the transmission time interval, and
the first reference signal configuration and the second reference signal configuration are received in a radio resource control message, a medium access control-control element message, or a downlink control information message, or a combination thereof.

26. The method of claim 20, further comprising:
transmitting or receiving multiple data streams while operating in the half duplex mode during the first portion of the transmission time interval based at least in part on a first rank indicator; and
transmitting or receiving a single data stream while operating in the full duplex mode during the second portion of the transmission time interval based at least in part on a second rank indicator.

27. The method of claim 20, further comprising:
transmitting a first precoding matrix indicator or a first rank indicator, or both, used for the wireless communication while operating in the half duplex mode, wherein the first precoding matrix used for the wireless communication while operating in the half duplex mode is based at least in part on the first precoding matrix indicator or the first rank indicator, or both; and
transmitting a second precoding matrix indicator or a second rank indicator, or both, used for the wireless communication while operating in the full duplex mode, wherein the second precoding matrix used for the wireless communication while operating in the full duplex mode during the second portion of the transmission time interval is based at least in part on the second precoding matrix indicator or the second rank indicator, or both.

28. The method of claim 20, further comprising:
determining a set of resources associated with using the second precoding matrix for the wireless communication while operating in the full duplex mode during the second portion of the transmission time interval based at least in part on a configuration from a network entity or a preconfigured rule, or both, wherein the configuration is received in a radio resource control message, a medium access control-control element message, or a downlink control information message, or a combination thereof.

29. The method of claim 20, wherein the first bandwidth part and the second bandwidth part are non-overlapping or overlapping.

30. A method for wireless communication at a network entity, comprising:
transmitting signaling that indicates a configuration for the wireless communication, the configuration comprising an indication for a user equipment (UE) to use:
a first set of parameters corresponding to a first set of parameter values when in a half duplex mode during a first portion of a transmission time interval, wherein a first parameter value of the first set of parameter values indicates a first precoding matrix associated with a first bandwidth part, and
a second set of parameters corresponding to a second set of parameter values when in a full duplex mode during a second portion of the transmission time interval, wherein a second parameter value of the second set of parameter values indicates a second precoding matrix associated with a second bandwidth part for the wireless communication, wherein the second precoding matrix is different than the first precoding matrix, and wherein one or more parameter values of the first set of parameter values are different than one or more parameter values of the second set of parameter values; and
communicating with the UE according to the configuration for the wireless communication.

31. The method of claim 30, further comprising:
communicating a number of data streams during the first portion of the transmission time interval based at least in part on a first rank indicator, wherein communicating the number of data streams comprises transmitting or receiving the number of data streams; and
communicating another number of data streams during the second portion of the transmission time interval based at least in part on a second rank indicator, wherein the another number of data streams associated with the second portion of the transmission time interval is different from the number of data streams associated with the first portion of the transmission time interval, wherein communicating the another number of data streams comprises transmitting or receiving the another number of data streams.

32. The method of claim 30, wherein:
the first portion of the transmission time interval and the second portion of the transmission time interval comprise separate reference signals;
a first reference signal associated with the first portion of the transmission time interval is precoded based at least in part on the first precoding matrix; and a second reference signal associated with the second portion of the transmission time interval is precoded based at least in part on the second precoding matrix.

33. The method of claim 32, wherein:
the first portion of the transmission time interval and the second portion of the transmission time interval correspond to separate reference signal configurations comprising a reference signal density in a time domain or a frequency domain, or both; and
a first reference signal configuration associated with the first portion of the transmission time interval is different than a second reference signal configuration associated with the second portion of the transmission time interval.

34. The method of claim 30, wherein the first bandwidth part and the second bandwidth part are non-overlapping or overlapping.

35. A non-transitory computer-readable medium storing code for wireless communication at a user equipment (UE), the code comprising instructions executable by one or more processors to cause the UE to:
operate in a half duplex mode using a first set of parameters corresponding to a first set of parameter values and during a first portion of a transmission time interval, wherein a first parameter value of the first set of parameter values indicates a first precoding matrix associated with a first bandwidth part, and wherein the first set of parameters are used for the wireless communication when in the half duplex mode;
operate in a full duplex mode using a second set of parameters corresponding to a second set of parameter values and during a second portion of the transmission time interval, wherein a second parameter value of the second set of parameter values indicates a second precoding matrix associated with a second bandwidth part, wherein the second set of parameters are used for the wireless communication when in the full duplex mode, wherein the second precoding matrix is different from the first precoding matrix, and wherein one or more parameter values of the first set of parameter values are different than one or more parameter values of the second set of parameter values; and
perform the wireless communication using the second set of parameters and based at least in part on the second precoding matrix and the second bandwidth part when in the full duplex mode during the second portion of the transmission time interval.

36. A non-transitory computer-readable medium storing code for wireless communication at a network entity, the code comprising instructions executable by one or more processors to cause the network entity to:
transmit signaling that indicates a configuration for the wireless communication, the configuration comprising an indication for a user equipment (UE) to use:
a first set of parameters corresponding to a first set of parameter values when in a half duplex mode during a first portion of a transmission time interval, wherein a first parameter value of the first set of parameter values indicates a first precoding matrix associated with a first bandwidth part, and
a second set of parameters corresponding to a second set of parameter values when in a full duplex mode during a second portion of the transmission time interval, wherein a second parameter value of the second set of parameter values indicates a second precoding matrix associated with a second bandwidth part for the wireless communication, wherein the second precoding matrix is different than the first precoding matrix, and wherein one or more parameter values of the first set of parameter values are different than one or more parameter values of the second set of parameter values; and
communicate with the UE according to the configuration for the wireless communication.

* * * * *